US012777076B1

(12) United States Patent
Dagostino et al.

(10) Patent No.: US 12,777,076 B1
(45) Date of Patent: Oct. 27, 2026

(54) LEVERAGING MICROSERVICE ORCHESTRATION FOR MODELING

(71) Applicant: Converge Insurance Service Solutions, New York, NY (US)

(72) Inventors: Anthony Vincent Dagostino, Rumson, NJ (US); Andrew Charles Shaughnessy, Brooklyn, NY (US); Thomas Michael Beale, Oakland, CA (US); Tae Thomas Kang, Cerritos, CA (US)

(73) Assignee: Converge Insurance Service Solutions, New York, NY (US)

( * ) Notice: Subject to any disclaimer, the term of this patent is extended or adjusted under 35 U.S.C. 154(b) by 98 days.

(21) Appl. No.: 18/740,312

(22) Filed: Jun. 11, 2024

Related U.S. Application Data

(60) Provisional application No. 63/472,902, filed on Jun. 14, 2023.

(51) Int. Cl.
*H04L 9/40* (2022.01)

(52) U.S. Cl.
CPC .......... *H04L 63/20* (2013.01); *H04L 63/1425* (2013.01)

(58) Field of Classification Search
CPC ...... G06F 21/577; G06N 20/00; G06N 3/088; H04L 63/20; H04L 63/1425
See application file for complete search history.

(56) References Cited

U.S. PATENT DOCUMENTS

| | | | | |
|---|---|---|---|---|
| 11,188,985 | B1 * | 11/2021 | Lietz | G06Q 50/184 |
| 11,829,486 | B1 * | 11/2023 | Lambotte | G06N 3/09 |
| 2019/0251260 | A1 * | 8/2019 | Stockdale | H04L 63/1425 |
| 2021/0279337 | A1 * | 9/2021 | Mosby | G06N 20/00 |
| 2023/0153825 | A1 * | 5/2023 | Srivastava | G06F 11/0757 707/703 |

* cited by examiner

*Primary Examiner* — Anh Nguyen
(74) *Attorney, Agent, or Firm* — Lee & Hayes, P.C.

(57) ABSTRACT

An example method includes receiving entity data indicating attributes associated with an entity, wherein the entity data includes a request for a cybersecurity policy and identifying, based at least in part on an individual attribute, a computer-centric workflow configured to process the attributes associated with the entity. The method further includes determining, using the workflow, exposure data associated with the entity and indicating cybersecurity exposure and generating, based at least in part on the exposure data, a first machine learning model configured to determine exposure scores associated with entities. The method also includes determining, using the first machine learning model, an exposure score associated with the entity, generating, based at least in part on the exposure data, a second machine learning model configured to determine pricing associated with cybersecurity policies, and determining, using the second machine learning model, a price associated with the cybersecurity policy for the entity.

20 Claims, 14 Drawing Sheets

LEVERAGING MICROSERVICE ORCHESTRATION FOR MODELING

CROSS-REFERENCE TO RELATED APPLICATIONS

This application claims priority to U.S. Provisional Application No. 63/472,902, filed Jun. 14, 2023, entitled "Leveraging Microservice Orchestration for Modeling," the entirety of which is herein incorporated by reference.

BACKGROUND

For many entities and businesses, the use of computer networking (e.g., Inter-net-of-Things (IoT) devices, Local-Area Networks (LANs) that are in one physical location, Wide-Area Networks (WANs) that extend over a large geographic area, Enterprise Networks, software-defined networks (SDNs), wireless networks, core networks, cloud networks, etc.) and related architectures has created flexibility, stability, portability, and scalability. However, the proliferation of computer networking and the computing landscape have increased the exposure of cyber security threats (e.g., phishing, ransomware, malware, distributed denial-of-service (DDoS) attacks, etc.), where breaches may be catastrophic for some entities and businesses. The amount of data required for evaluating cyber security maturity creates a need for a platform architecture that is modern, flexible, and extendible.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
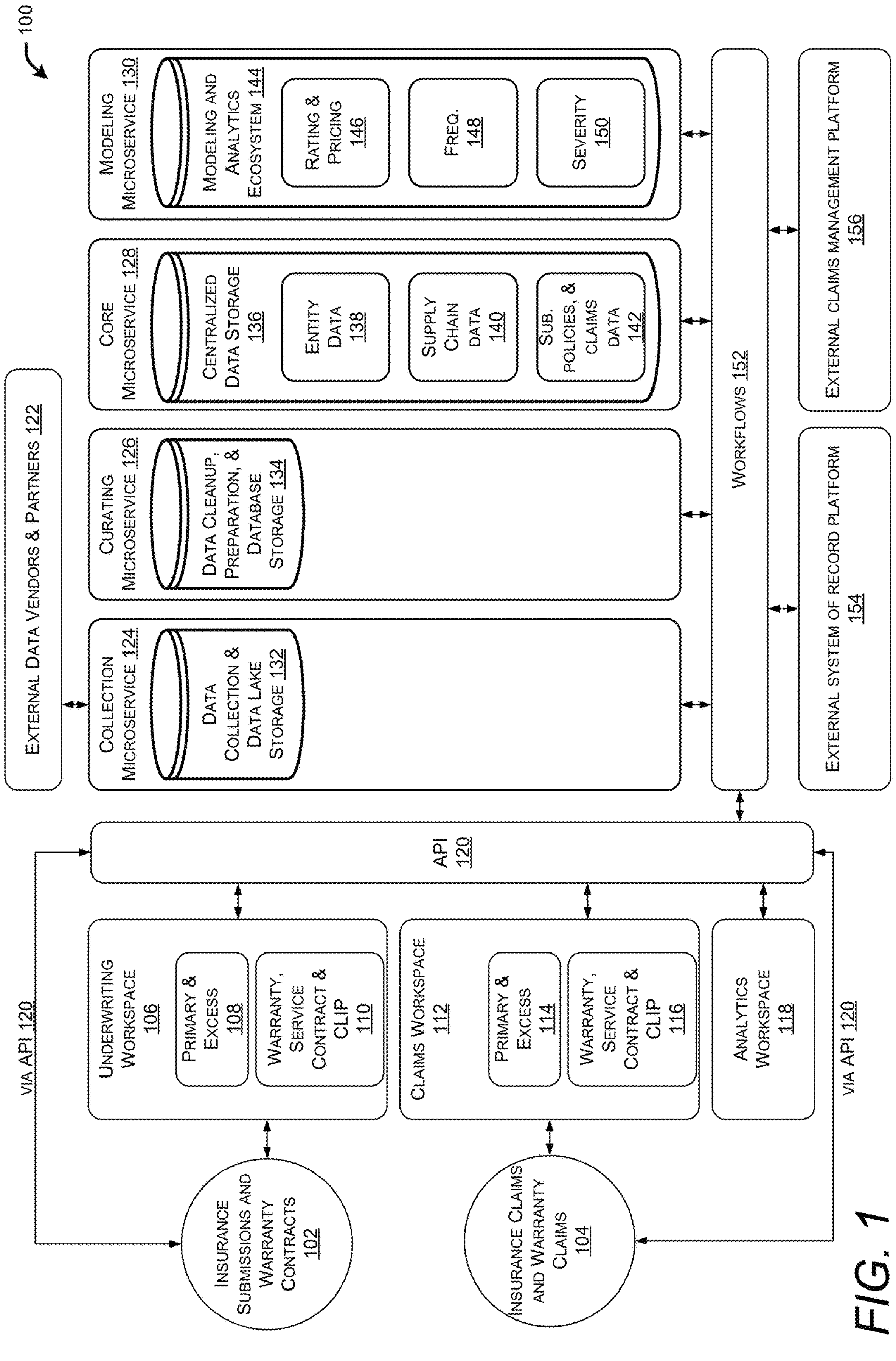
FIG. 1 illustrates a sequence diagram of an example process for performing data processing given different types of user submission, according to at least some examples.

This application describes systems and techniques for processing submission data by creating and using dynamic and computer-centric workflows that are submission-specific, and generating a cybersecurity policy via the workflows and/or models. A data processing system may receive submission data that has been provided by and/or received from a user (e.g., an entity, business, insurance broker, digital platform, third-party service provider, commercial data vendors, etc.). The submission data may be processed such that it may be in a utilizable format and stored. The data may also include an attribute associated with the user and/or entity. For example, the attribute associated with the entity may include an indication of the type of business associated with the entity (e.g., identification of the entity, a program associated with the entity, potential partners, revenue thresholds, industry class, etc.). The data processing system may be configured to process the submission data in order to identify one or more attributes associated with the entity. Based on the one or more attributes associated with the entity, the data processing system may be configured to identify a computer-centric workflow that is suitable for processing the submission data of the user, and generate exposure data associated with the entity. The exposure data may indicate a cybersecurity exposure and/or other types of exposures associated with the entity. Additionally, or alternatively, the data processing system may be configured to generate one or more models to determine exposure scores dynamically. Based on the exposure scores determined by the one or more models, the data processing system may be configured to determine pricing data for a cybersecurity policy, and/or other types of policies, for the user. This way, data from the users may be used to dynamically identify cybersecurity exposures, and generate a policy accordingly.

Traditionally, as discussed above, for many entities and businesses, the use of computer networking (e.g., Inter-net-of-Things (IoT) devices, Local-Area Networks (LANs) that are in one physical location, Wide-Area Networks (WANs) that extend over a large geographic area, Enterprise Networks, software-defined networks (SDNs), wireless networks, core networks, cloud networks, etc.) and related architectures has created flexibility, stability, portability, and scalability. However, the proliferation of computer networking and the computing landscape have increased the exposure of cyber security threats (e.g., phishing, ransomware, malware, distributed denial-of-service (DDoS) attacks, etc.), where breaches may be catastrophic for some entities and businesses. The amount of data required for effective cyber security creates a need for a platform architecture that is modern, flexible, and extendible.

Conventional systems allow insurers to use the personal information of potential insureds (e.g., claims history, driving history, lifestyle, health, location, etc.) to determine exposures associated with the potential insured, and in turn, generate policies for home, auto, health, and/or the like. However, such policies are typically generated using a stagnant algorithm and/or platform, with the personal information used merely as input. Additionally, in typical examples, underwriting platforms may require a familiarity with programming and/or coding techniques (e.g., computer languages, development environments, etc.) in order to generate a complex workflows. The use of traditional programming and/or coding techniques may be time-intensive and may create inefficiencies for automation and/or scaling.

Described herein are, at least in part, techniques for processing submission data by creating and using dynamic workflows, which may include one or more microservices, that are submission-specific, and generating a cybersecurity policy via the workflows and/or models. The techniques described herein may be applicable in various scenarios, including scenarios where a user (e.g., underwriters, insurance brokers, etc.) would like to process submission data for an insurance policy (e.g., a cybersecurity policy) in order to determine an exposure profile for an insured and/or potential insured. Various examples of the present disclosure include systems, methods, and non-transitory computer-readable media of a data processing system.

A user of a data processing system may have data that may be used in identifying exposures, such as a cybersecurity exposure associated with an entity, enterprise, individual, etc. The user of the data processing system may include the entity, enterprise, individuals, etc. Additionally, or alternatively, the user of the data processing system may be a broker, associated with a digital platform, etc. In some examples, the user data may be included as part of an insurance submission, where the user data may indicate a request for an exposure profile, pricing information for an insurance policy, and/or the like. Additionally, or alternatively, the user data may be associated with an existing insurance policy and/or an insurance claim under an existing policy. The data processing system may enable the user to share data via an application installed on a user device and/or via a web-based application accessed via a web browser. Additionally, or alternatively, the user data may be pushed to the data processing system and/or pulled to the data processing system via connections established by the data processing system (e.g., application programming interface (API) calls with a platform and/or application running on a user device). The user data may include indications of information associated with the user. For example, the user data may include an indication of the type of company (e.g., sole proprietorship, corporation, partnership, limited liability company, etc.), the size of the company, the industry classification (e.g., extraction and agriculture, manufacturing, services, etc.), revenue, and/or the like. Additionally, or alternatively, the user data may include third-party data, cybersecurity control data and/or sub-control data (e.g., the use of access controls, firewalls, antivirus software, encryption, etc.), etc.

Additionally, or alternatively, the data processing system may use, or work in combination with, a directed acyclic graph (DAG) component in order to identify a workflow and/or one or more other microservices to collect additional user data and/or fulfill the request for an exposure profile. For example, once the data processing system has received the user data, the data processing system may be configured to identify one or more attributes associated with the user and/or user data. For example, the data processing system may identify attributes associated with the user and/or user data such as the type of company, the size of the company, the industry classification, and/or the revenue. In one example, the data processing system may identify, from user data associated with an entity, that the entity is a sole proprietorship with 30 employees and in the services industry. In another example, the data processing system may identify, from user data associated with an entity, that the entity is a corporation with 500 employees and in the agriculture industry. Based on the one or more attributes identified by the data processing system, the data processing system and/or DAG component may further be configured to identify a workflow that is specific to the entity, where the workflow may be usable by the data processing system to generate an exposure profile associated with the entity. For example, a workflow and/or microservice may be specific to a "smaller" entity (e.g., the entity that is a sole proprietorship with 30 employees and in the services industry) or a "larger" entity (e.g., the entity that is a corporation with 500 employees and in the agriculture industry).

Additionally, or alternatively, based on the workflow that is specific to the entity, the data processing system and/or DAG component may further be configured to process the user data and/or trigger other types of microservices. For example, based on the workflow that is specific to the entity, the data processing system may be configured to further collect entity firmographics (e.g., data indicating performance, industry, size, location, etc.), execute security exposure assessments, and/or other types of data based on the DAG microservice. The user data collected by the data processing system may be collected via questions provided to the user. For example, the questions may relate to a user's preference for cyber security, hardware, software, and/or the like. Additionally, or alternatively, the questions may relate to access controls, data assets and compliance, employee training on security policies, types of software used by the entity, business continuity and disaster recovery, media liability, cybercrime, and/or prior losses and incidents. Continuing from the example above, a "smaller" entity may require less questions than a "larger" entity. In other words, the data processing system may use microservices that may be "scaled up" and/or "scaled down" using, and/or working in combination with, the DAG. Once the data processing system has received user data from the user and/or question responses, the data processing system may be configured to further process the user data. For example, the user data may be processed such that the user data is filtered and/or transformed into a consistent format and stored in a graphical database.

Once the data processing system has received user data from the user and/or question responses, the data processing system may be configured to use, or work in combination with, the DAG component to execute additional microservices, such as the determination of an exposure profile related pricing for an insurance policy based on the exposure profile. For example, the data processing system may determine an exposure profile. The data processing system may determine, as part of the exposure profile, one or more scores associated with the entity. Additionally, or alternatively, the data processing system may determine one or more factors (e.g., weighting factors) and may determine the one or more scores based on the one or more factors. In some examples, the one or more scores based on the one or more factors may be based on the workflow that is specific to the entity and indicated by the data processing system and/or DAG. For example, similar data for different types of entities may produce different scores based on the workflows that are specific to the entities, and/or data may be weighed differently based on the workflows that are specific to the entities.

The exposure profile, and/or the one or more scores contained therein, may be determined by a machine learning model configured to determine the exposure profile and/or scores associated with the entity. The machine learning model may be trained by determining one or more scores and/or exposure profiles associated with user data across a plurality of entities over time. Additionally, or alternatively, a price associated with the exposure profile may be determined by a machine learning model configured to determine the pricing associated with the exposure profile. The machine learning model may be trained by determining one or more scores and/or exposure profiles associated with user data across a plurality of entities over time.

These and other aspects are described further below with reference to the accompanying drawings. The drawings are merely example implementations and should not be construed to limit the scope of the claims. For example, while examples are illustrated in the context of a user interface for a mobile device, the techniques may be implemented using any computing device and the user interface may be adapted to the size, shape, and configuration of the particular computing device.

FIG. 1 illustrates a sequence diagram of an example process for performing data processing via data processing system 100 given different types of user submission, according to at least some examples.

A user of the data processing system 100 may have data that may be used in identifying exposures, such as a cybersecurity exposure associated with an entity, enterprise, individual, etc. The user of the data processing system 100 may include the entity, enterprise, individuals, etc. Additionally, or alternatively, the user of the data processing system 100 may be a broker, associated with a digital platform, etc. In some examples, the user data may be included as part of an insurance submission and/or warranty contracts 102. For example, the user data, as part of insurance submissions and warranty contracts 102, may include an indication of a request for an exposure profile, pricing information for an insurance policy, and/or the like. Additionally, or alternatively, the user data may be included as part of insurance claims and/or warranty claims 104. In another example, the user data, as part of insurance claims and warranty claims 104, may include an indication of an insurance claim and/or warranty claim, where the user data may be associated with an existing insurance policy and/or an insurance claim under an existing policy.

In some instances, the data may be received in the underwriting workspace 106 and/or claims workspace 112. As described with more detail in FIG. 2, the user data May be received from a user device. User devices may communicate with the underwriting workspace 106 and/or claims workspace 112 over networks, such as the Internet. Additionally, or alternatively, the user devices may communicate with the underwriting workspace 106 and/or claims workspace 112 over a collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks). Additionally, or alternatively, user devices from which the user data may be received may include desktop computers, laptop computers, tablet computers, mobile devices (e.g., smart phones or other cellular or mobile phones, mobile gaming devices, portable media devices, etc.), or other suitable computing devices. The user devices may execute one or more client applications, such as a web browser (e.g., Microsoft Windows Internet Explorer, Mozilla Firefox, Apple Safari, Google Chrome, Opera, etc.) and/or a native or special-purpose client application (e.g., social media applications, messaging applications, email applications, games, etc.). For example, the user data may be received by the underwriting workspace 106 and/or claims workspace 112 via email from a user, where the user may be an insurance broker. Additionally, or alternatively, the underwriting workspace 106 and/or claims workspace 112 may be configured to extract user data by establishing connections (e.g., application programming interface (API) calls with applications running on the user devices) via API 120.

Upon receiving user data, the underwriting workspace 106 may be configured to send the data to the primary and excess workflow 108 and/or the warranty, service contract, and contractual liability insurance policy (CLIP) workflow 110. In some instances, the underwriting workspace 106 may be associated with an agent of the data processing system 100, where the agent may send the user data to the primary and excess workflow 108 and/or the warranty, service contract, and CLIP workflow 110. For example, the user data may be sent to the primary and excess workflow 108 based on an indication in the insurance submissions and warranty contracts 102 for primary insurance coverage and/or excess insurance coverage. Additionally, or alternatively, the user data may be sent to the warranty, service contract, and CLIP workflow 110 based on an indication in the insurance submissions and warranty contracts 102 for insurance coverage related to a warranty, service contract, and/or other type of contract.

Additionally, or alternatively, upon receiving user data, the claims workspace 112 may be configured to send the data to the primary and excess workflow 114 and/or the warranty, service contract, and contractual liability insurance policy (CLIP) workflow 116. In some instances, the claims workspace 112 may be associated with an agent of the data processing system 100, where the agent may send the user data to the primary and excess workflow 114 and/or the warranty, service contract, and CLIP workflow 116. For example, the user data may be sent to the primary and excess workflow 114 based on an indication in the insurance claims and warranty claims 104 for a claim under primary insurance coverage and/or excess insurance coverage. Additionally, or alternatively, the user data may be sent to the warranty, service contract, and CLIP workflow 116 based on an indication in the insurance claims and warranty claims 104 for insurance coverage related to a warranty, service contract, and/or other type of contract.

In some instances, the user data, such as user data received as part of the insurance submissions and warranty contracts 102 and/or insurance claims and warranty claims 104, may include indications of information (e.g., attributes) associated with the user and/or entity (e.g., if the user is an insurance broker submitting an insurance submission on behalf of an entity). For example, the user data may include an indication of the type of company associated with the entity (e.g., sole proprietorship, corporation, partnership, limited liability company, etc.), the size of the company, industry classification (e.g., extraction and agriculture, manufacturing, services, etc.), revenue, and/or the like. In some instances, the data processing system 100 may use, or work in combination with, analytics workspace 118 in order to identify and/or determine the attributes associated with the user and/or entity. For example, once the data processing system 100 has received the user data, the data processing system 100 and/or the analytics workspace 118 may be configured to identify one or more attributes associated with the user and/or user data. For example, the data processing system 100 and/or the analytics workspace 118 may identify attributes associated with the user and/or user data such as the type of company, the size of the company, the industry classification, and/or the revenue. In one example, the data processing system 100 and/or analytics workspace 118 may identify, from user data associated with an entity, that the entity is a sole proprietorship with 30 employees and in the services industry. In another example, the data processing system 100 and/or analytics workspace 118 may identify, from user data associated with an entity, that the entity is a corporation with 500 employees and in the agriculture industry. Based on the one or more attributes identified by the data processing system 100 and/or analytics workspace 118, the data processing system and/or DAG component may further be configured to identify a workflow 152 that is specific to the entity, where the workflow 152 may be usable by the data processing system 100 to generate an exposure profile associated with the entity. For example, a workflow 152 and/or microservice may be specific to a "smaller" entity (e.g., the entity that is a sole proprietorship with 30 employees and in the services industry) or a "larger" entity (e.g., the entity that is a corporation with 500 employees and in the agriculture industry).

As mentioned, the data processing system 100 may work in combination with a DAG component in order to identify workflows 152 and/or other microservices to collect additional user data and/or fulfill a request for an exposure profile, insurance submission, insurance claim, and/or the like. The workflow 152 may include a collection microservice 124, curating microservice 126, core microservice 128, and/or modeling microservice 130 that is specific to one or more entities. For example, based on the workflow 152 that is specific to the entity, the data processing system may be configured to further collect entity firmographics (e.g., data indicating performance, industry, size, location, etc.), security exposure assessments, and/or other types of data based on the DAG microservice via collection microservice 124. The user data collected by the collection microservice 124 may be collected via questions provided to the user. For example, the questions may relate to a user's preference for cyber security, hardware, software, and/or the like. Additionally, or alternatively, the questions may relate to access controls, data assets and compliance, employee training on security policies, types of software used by the entity, business continuity and disaster recovery, media liability, cybercrime, and/or prior losses and incidents. Continuing from the example above, a "smaller" entity may require less questions than a "larger" entity. In other words, the data processing system may use microservices that may be "scaled up" and/or "scaled down" using, and/or working in combination with, the DAG. Additionally, or alternatively, the data processing system, based on the workflow 152, may further collect data associated with the entity from external data vendors and partners 122, an external system of record platform 154, and/or an external claims management platform 156.

The data that may be collected by the collection microservice 124 may be stored at data collection and data lake storage 132. For example, the data collected by the collection microservice 124 may be stored in raw JSON format using a folder structure based on a year, month, day, and/or time collected. Data collection and data lake storage 132 may comprise one, or multiple, repositories or other storage locations for persistently storing and managing collections of data such as databases, simple files, binary, and/or any other data. The data collection and data lake storage 132 may include one or more storage locations that may be managed by one or more storage/database management systems. The data collection and data lake storage 132 may include volatile media (such as random access memory (RAM)) and/or nonvolatile media (such as read only memory (ROM), Flash memory, optical disks, magnetic disks, and so forth). The data collection and data lake storage 132 may include fixed media (e.g., RAM, ROM, a fixed hard drive, and so on) as well as removable media (e.g., Flash memory, a removable hard drive, an optical disc, and so forth).

Once the data is collected by the collection microservice 124, the data processing system 100 may use, or work in combination with, curating microservice 126 to further process the user data. For example, the user data may be processed such that the user data is filtered and/or transformed into a consistent format and stored in a graphical database. In some instances, the curating microservice 126 may be configured to extract, transform, and/or load data and load the data into relational and graphical database stores. For example, the processed user data may be stored at data cleanup, preparation, and database storage 134. Data cleanup, preparation, and database storage 134 may comprise one, or multiple, repositories or other storage locations for persistently storing and managing collections of data such as databases, simple files, binary, and/or any other data. The data cleanup, preparation, and database storage 134 may include one or more storage locations that may be managed by one or more storage/database management systems. The data cleanup, preparation, and database storage 134 may include volatile media (such as random access memory (RAM)) and/or nonvolatile media (such as read only memory (ROM), Flash memory, optical disks, magnetic disks, and so forth). The data cleanup, preparation, and database storage 134 may include fixed media (e.g., RAM, ROM, a fixed hard drive, and so on) as well as removable media (e.g., Flash memory, a removable hard drive, an optical disc, and so forth).

Additionally, or alternatively, the data processing system 100 may use, or work in combination with, core microservice 128 such that the data may be organized and/or stored at the centralized data storage 136. Centralized data storage 136 may comprise one, or multiple, repositories or other storage locations for persistently storing and managing collections of data such as databases, simple files, binary, and/or any other data. The centralized data storage 136 may include one or more storage locations that may be managed by one or more storage/database management systems. The centralized data storage 136 may include volatile media (such as random access memory (RAM)) and/or nonvolatile media (such as read only memory (ROM), Flash memory, optical disks, magnetic disks, and so forth). The centralized data storage 136 may include fixed media (e.g., RAM, ROM, a fixed hard drive, and so on) as well as removable media (e.g., Flash memory, a removable hard drive, an optical disc, and so forth). As a non-limiting example, the core microservice 128 may organize data associated with one or more entities into entity data 138 (e.g., entity name, revenue associated with an entity, industry data, technographic data, vulnerability data, etc.), supply chain data 140 (e.g., data associated with first-party vendors, second-party vendors, third-party vendors, etc.), and/or submission policies and claims data 142 (e.g., data associated with current claims, data associated with prior claims, insurance submission data, quote data, endorsement data, and/or other types of insurance data). Additionally, or alternatively, although not illustrated, the core microservice 128 may organize data associated with one or more entities into mapping data, which may include mappings associated with and/or between cybersecurity control data, cybersecurity sub-controls, third-party data, and/or the like.

The data processing system 100 may be configured to use, or work in combination with, a DAG component to execute additional microservices, such as the determination of an exposure profile related pricing for an insurance policy based on the exposure profile. For example, the data processing system 100 may use, or work in combination with, the modeling microservice 130 in order to determine ratings, pricing, exposure scoring, ground up loss models, insured loss models, and/or the like. The modeling microservice 130 may include a database of machine-learning models, such as modeling and analytics ecosystem 144. For example, the machine learning models as described herein may include predictive analytic techniques, which may include, for example, predictive modelling, machine learning, and/or data mining. Generally, predictive modelling may utilize statistics to predict outcomes. Machine learning, while also utilizing statistical techniques, may provide the ability to improve outcome prediction performance without being explicitly programmed to do so. A number of machine learning techniques may be employed to generate and/or modify the models describes herein. Those techniques may include, for example, decision tree learning, association rule learning, artificial neural networks (including, in examples, deep learning), inductive logic programming, support vector machines, clustering, Bayesian networks, reinforcement learning, representation learning, similarity and metric learning, sparse dictionary learning, and/or rules-based machine learning.

For example, the modeling microservice 130 may determine an exposure profile. The data processing system may determine, as part of the exposure profile, a rating and pricing 146 associated with the entity. In some examples, the rating and pricing 146 may include one or more scores based on one or more factors, and may further be based on the workflow that is specific to the entity and indicated by the data processing system 100 and/or DAG. For example, similar data for different types of entities may produce different rating and pricings 146 based on the workflows that are specific to the entities, and/or data may be weighed differently based on the workflows that are specific to the entities. The rating and pricing 146 may be determined by a machine learning model configured to determine the exposure profile and/or scores associated with the entity. The machine learning model may be trained by determining one or more scores and/or exposure profiles associated with user data across a plurality of entities over time. Additionally, or alternatively, the rating and pricing 146 may be determined by a machine learning model configured to determine the pricing associated with the exposure profile. The machine learning model may be trained by determining one or more scores and/or exposure profiles associated with user data across a plurality of entities over time. Additionally, or alternatively, the modeling microservice 130 may be configured to determine frequency 148, which may indicate a frequency and/or probability of an insurable event occurring. Additionally, or alternatively, the modeling microservice 130 may determine severity 150, which may indicate a severity associated with an insurable event (e.g., monetary impact, number of lost records, etc.).

In some instances, based on the workflow and/or microservices configured by the data processing system, various user interface components may be provided to the user of the data processing system 100 (e.g., displayed via a user interface device). The user interface components may be selectable by the user. Additionally, or alternatively, the user interface components may be dynamically updated based on input and/or changes by the user and/or based on changes in the workflow and/or microservices configured by the data processing system.

The questions included in the questionnaire 504 may be provided to the user dynamically and based on the workflow and/or microservices configured by the data processing system 100 that may be specific to an entity. For example, based on the entity that is the subject of the submission 502, questions that are more relevant to the entity may be provided in the questionnaire 504, and may be dynamically updated based on responses to other questions. Additionally, or alternatively, the questionnaire 504 may include user interface components, such as user interface components 512 and/or 514. For example, user interface component 512 may be used to decline coverage and/or insurance for the entity. Additionally, or alternatively, user interface component 514 may be used by the user to proceed to the other components of the submission 502.

While not illustrated, the data processing system 100 may be associated with processor(s) associated with the components and/or microservices of the system, and may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) and/or the processor(s) described with respect to the components of the system may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) associated with the components and/or microservices of the system may possess its own local memory, which also may store program components, program data, and/or one or more operating systems.

In addition, while not illustrated, each respective memory, such as the memory described with respect to the microservices of the data processing system 100, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

In addition, while not illustrated, each respective component and/or microservice of the data processing system 100 may be associated with network interface(s), and may enable communication between the various components and/or microservices, as well as other networked devices. Such network interface(s) may include one or more network interface controllers (NICs) or other types of transceiver devices to send and receive messages over the network. For instance, each of the network interface(s) may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) may include a wide area network (WAN) component to enable message over a wide area network.

Figure 2:
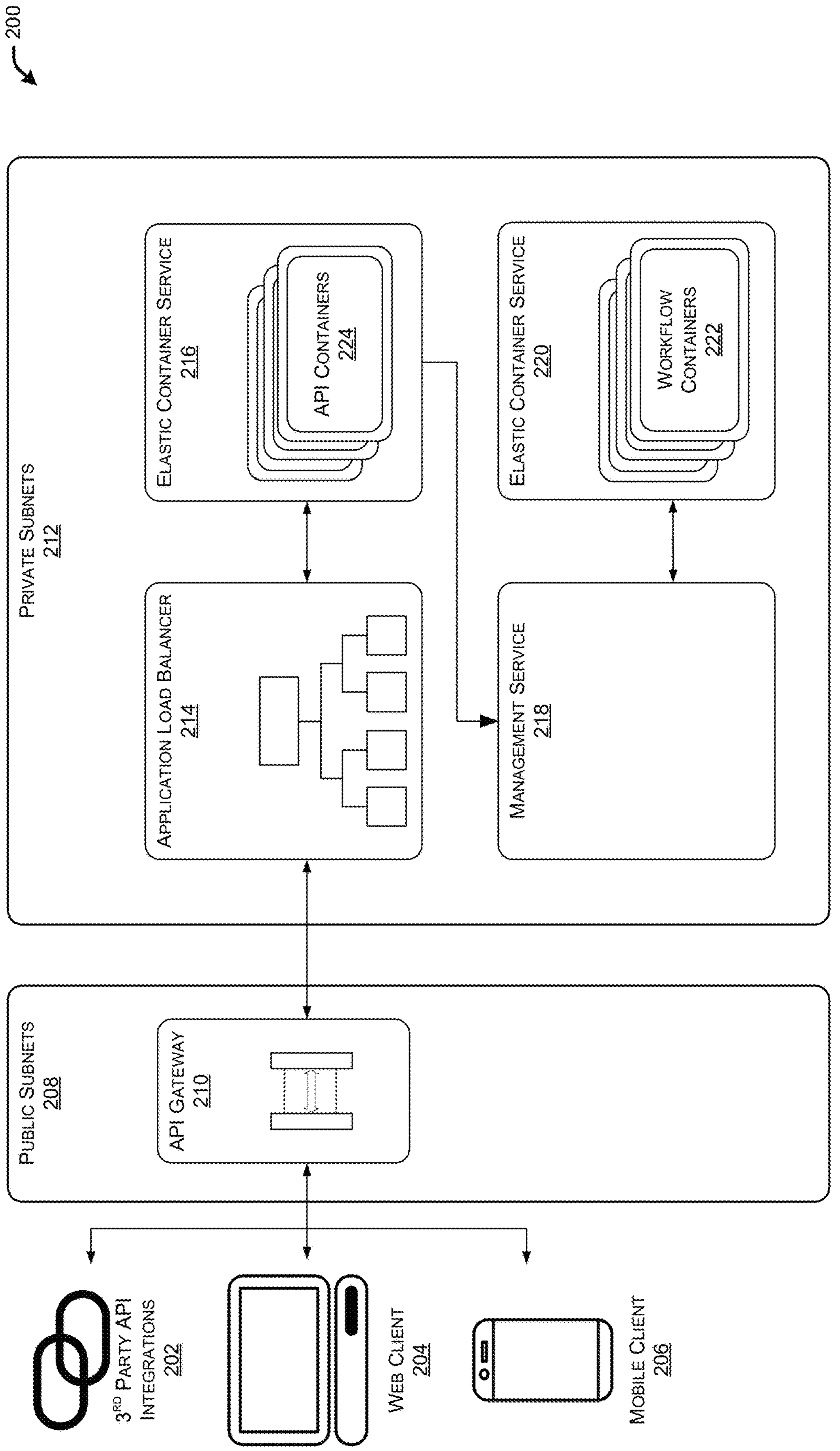
FIG. 2 illustrates a schematic diagram of an example environment for microservice building and deployment within the platform, according to at least some examples.

FIG. 2 illustrates a schematic diagram of an example environment 200 for microservice building and deployment within the platform, according to at least some examples. As mentioned with respect to FIG. 1, workflows 152 that are specific to an entity may include a collection microservice 124, curating microservice 126, core microservice 128, and/or modeling microservice 130. Additionally, or alternatively, the workflows 152 may comprise of various different microservices that may be scaled based on demand. User data associated with an entity, such as data included in an insurance submission, may be received by the data processing system 100 via third party API integrations 202, web client 204, and/or mobile client 206. For example, for third party API integrations 202, the data processing system 100 may be configured to extract user data by establishing connections (e.g., API calls with applications running on user devices) via an API gateway 210. User data associated with an entity may also be received via a web client 204 and/or mobile client 206 via API gateway 210 and/or public subnets 208.

Additionally, or alternatively, web client 204 and/or mobile client 206 from which the user data may be received may include desktop computers, laptop computers, tablet computers, mobile devices (e.g., smart phones or other cellular or mobile phones, mobile gaming devices, portable media devices, etc.), or other suitable computing devices. The web client 204 and/or mobile client 206 may execute one or more client applications, such as a web browser (e.g., Microsoft Windows Internet Explorer, Mozilla Firefox, Apple Safari, Google Chrome, Opera, etc.) and/or a native or special-purpose client application (e.g., social media applications, messaging applications, email applications, games, etc.). Users of the web client 204 and/or mobile client 206 may include an entity, enterprise, individual, etc. Additionally, or alternatively, the users may include an insurance broker and/or user associated with a digital platform sending user data on behalf of an entity, enterprise, individual, etc. In some instances, the third party API integrations 202, web client 204, and/or mobile client 206 may communicate with the data processing system 100 over public subnets 208. Public subnets 208 and/or private subnets 212 may include a collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks). Additionally, or alternatively, public subnets 208 and/or private subnets 212 may configured in a virtual private cloud (VPC), where the user of the data processing system may have one or more virtual resources, such as VM instances, running thereon to provide cloud services to the user.

Once the user data has been received by the data processing system 100, the users of the data processing system 100 may create, use, and/or scale microservices as part of a workflow for processing user data in private subnets 212. The users may create, use, and/or scale microservices by way of an application load balancer 214, an elastic container service 216 with API containers 224, a management service 218, and/or an elastic container service 220 with workflow containers 222. For example, the user of the data processing system 100 may be an insurance broker with a large amount of user data submissions (e.g., user data submissions for multiple large entities) to be processed. In order to process the large amount of user data submissions and generate exposure profiles and associated pricing for the multiple large entities, complex workflows may be configured with large amounts of microservices. Using the application load balancer 214, management service 218, elastic container service 216 and/or elastic container service 220, the data processing system 100 may "spin up" and/or or "scale up" API containers 224 and/or workflow containers 222 such that the large amount of user data may be processed. Once the large amount of user data is processed and/or exposure profiles and associated pricing are generated, the data processing system 100 may "spin down" and/or "scale down" API containers 224 and/or workflow containers 222 to a bare minimum state. This way, reducing the number of container instances in the private subnets 212 may lower infrastructure costs, increase resource optimization, and overall improve performance of the data processing system 100. Additionally, or alternatively, the data processing system 100 may be able to quickly respond to changes in workload demand, such as when a large amount of user data may be submitted by a user.

Figure 3A:
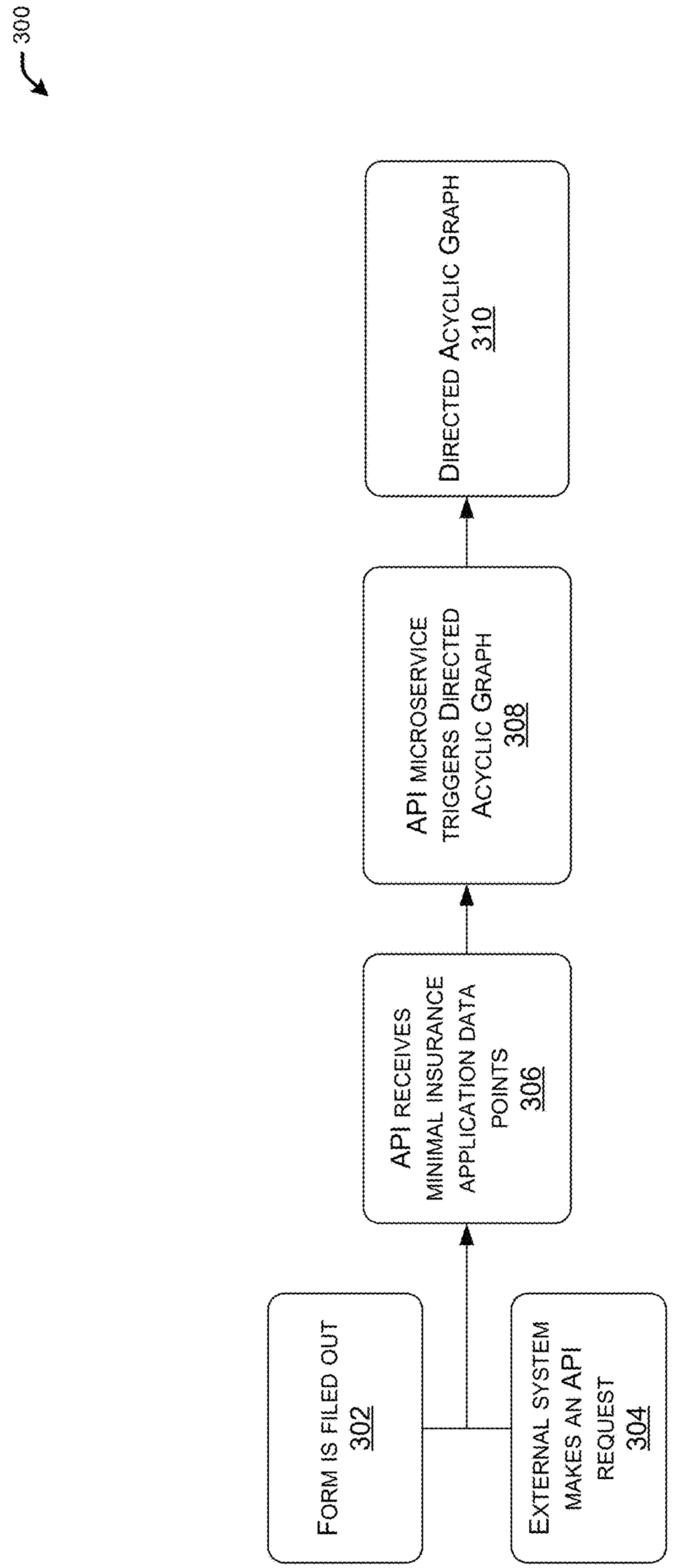
FIG. 3A illustrates a flow diagram of an example process for data to be given to a directed acyclic graph, according to at least some examples.

FIG. 3A illustrates a flow diagram of an example process 300 for data to be given to a directed acyclic graph (DAG), according to at least some examples. At block 302, the configuration of microservices in a workflow may begin by a user filling out a form. For example, a user of the data processing system 100 may fill out of a form (e.g., online submission) to provide user data associated with an entity. At block 304, the configuration of microservices in a workflow may begin by an external system making an API request, wherein the API request may include user data associated with an entity. The data may then trigger the directed acyclic graph microservice. At block 306, the API may receive minimal insurance application data points (e.g., attributes associated with the entity). The API microservice may trigger a directed acyclic graph 308. As previously described in FIG. 1, the directed acyclic graph may identify workflows and/or other microservices based on the attributes associated with an entity in order to generate an exposure profile, pricing information associated with an exposure profile, and/or the like. At block 310, the directed acyclic graph may be executed.

Figure 3B:
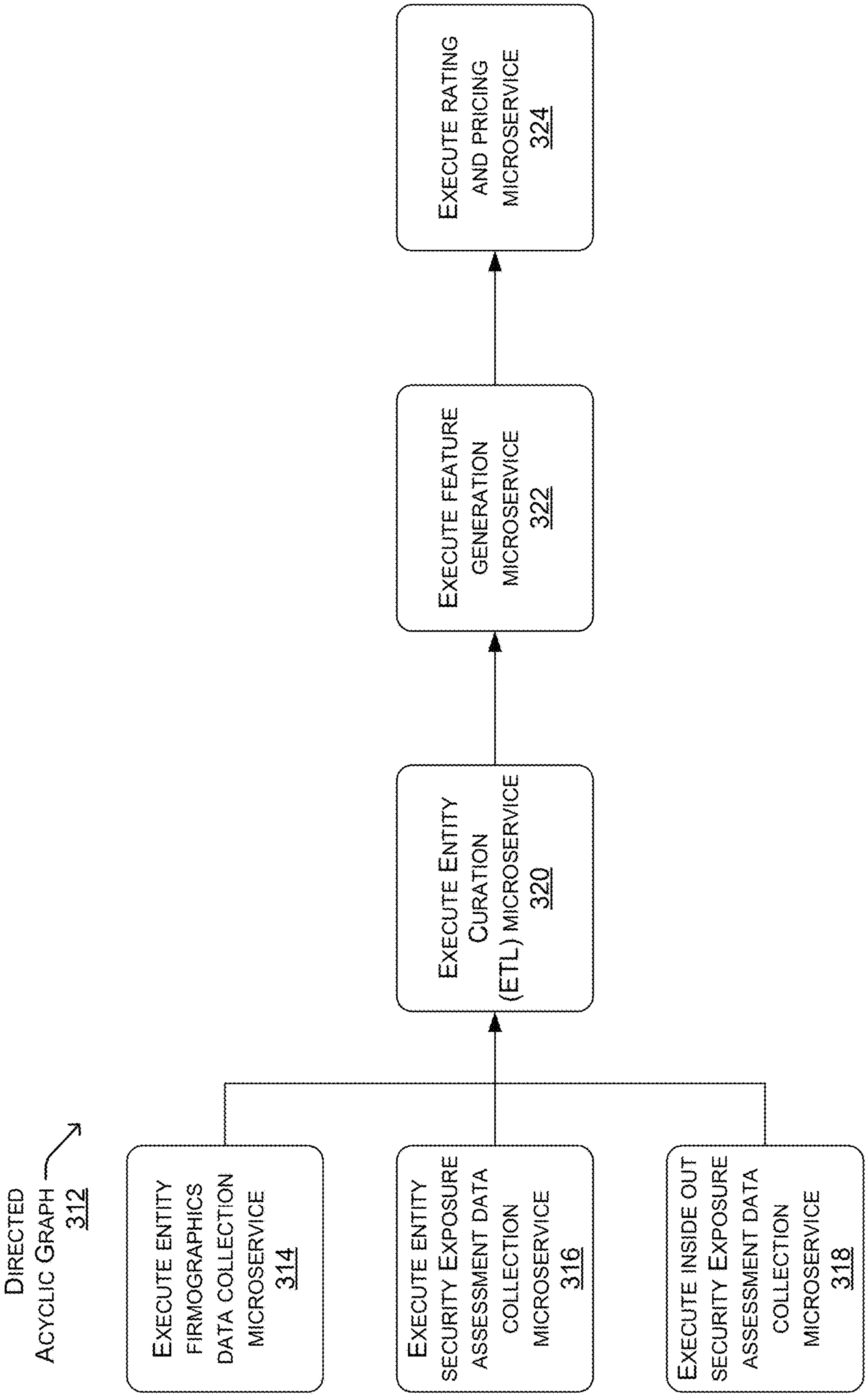
FIG. 3B illustrates a flow diagram of an example process for executing a rating and pricing microservice, according to at least some examples.

FIG. 3B illustrates a flow diagram of an example process of a directed acyclic graph 312 for executing a rating and pricing microservice. For example, based on the attributes associated with an entity, a directed acyclic graph 312 may be executed and may be configured to process user data in a workflow and/or identify a workflow that is specific to the entity using one or more microservices. The data processing system 100 may include directed acyclic graphs that are different from directed acyclic graph 312. For example, a directed acyclic graph, and related workflows and/or microservices determined and/or executed by the directed acyclic graph, for a smaller entity may be different than a directed acyclic graph for a larger entity. As illustrated, an example directed acyclic graph 312 may execute an entity firmographics data collection microservice at block 314. Additionally, or alternatively, at block 316, the example directed acyclic graph 312 may execute an entity security exposure assessment data collection microservice. Additionally, or alternatively, at block 318, the example directed acyclic graph 312 may execute an inside out security exposure assessment data collection microservice. In some examples, at block 320, the example directed acyclic graph 312 may be configured to execute an entity curation (ETL) microservice. In this example, the directed acyclic graph 312 may be configured to extract data (e.g., data associated with the execution of one or more data collection microservices) where the data may be in an unstructured format (e.g., "raw" data). The execution of the ETL microservice may further include transforming the unstructured data into a consistent format, and loading and/or storing the transformed data in a database. Additionally, or alternatively, at block 322, the example directed acyclic graph 312 may be configured to execute a feature generation microservice. For example, the feature generation microservice of block 322 may generate and/or identify feature data from the transformed data of the ETL microservice. The feature data may include one or more representations of the data, and may be used by a rating and pricing microservice. Additionally, or alternatively, at block 324, the example directed acyclic graph 312 may execute the rating and pricing microservice. For example, the rating and pricing microservice of block 324 may determine a security rating for the entity and related pricing by a machine learning model configured to determine the exposure profile and/or scores associated with the entity. The machine learning model may be trained by determining one or more scores and/or exposure profiles associated with user data across a plurality of entities over time. Additionally, or alternatively, the pricing may be determined by a machine learning model configured to determine the pricing associated with the exposure profile. The machine learning model may be trained by determining one or more scores and/or exposure profiles associated with user data across a plurality of entities over time.

Figure 4:
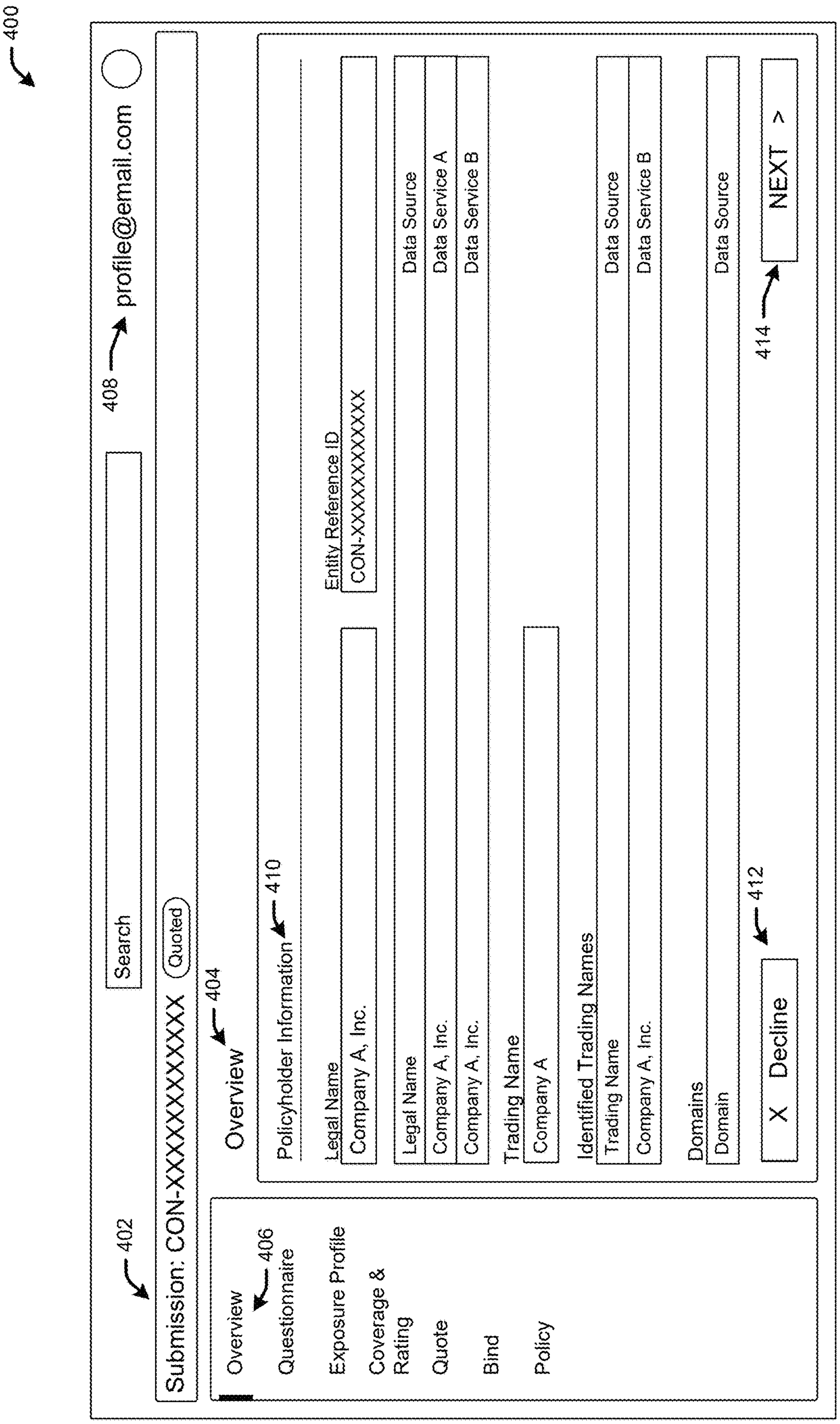
FIG. 4 illustrates a schematic diagram of an example environment for a user overview, according to at least some examples.

FIG. 4 illustrates a schematic diagram of an example environment 400 for a user overview 404, according to at least some examples. As illustrated, the user profile overview 404 may be included as part of an insurance submission 402, where the insurance submission may be provided by a user of the data processing system 100 (e.g., entity, enterprise, individual, broker on behalf of the entity, enterprise, individual, etc.). The submission 402 may include an indication of the contact information 408 associated with the user, entity, etc. As illustrated, the example environment 400 may include an indication of the overview 406 along with other components associated with the submission 402. Included in the overview 404 may be different types of policyholder information 410 (e.g., information associated with the entity, enterprise, individual, etc.). As illustrated, the policyholder information 410 may include legal name, entity reference ID, legal name with an indication of the source of the information, trading name, identified trading names with an indication of the source of the information, and/or domains with an indication of the source of the information. The overview 404 may include other types of information. Additionally, or alternatively, the overview 404 may include user interface components, such as user interface components 412 and/or 414. For example, user interface component 412 may be used to decline coverage and/or insurance for the entity. Additionally, or alternatively, user interface component 414 may be used by the user to proceed to the other components of the submission 402.

Figure 5:
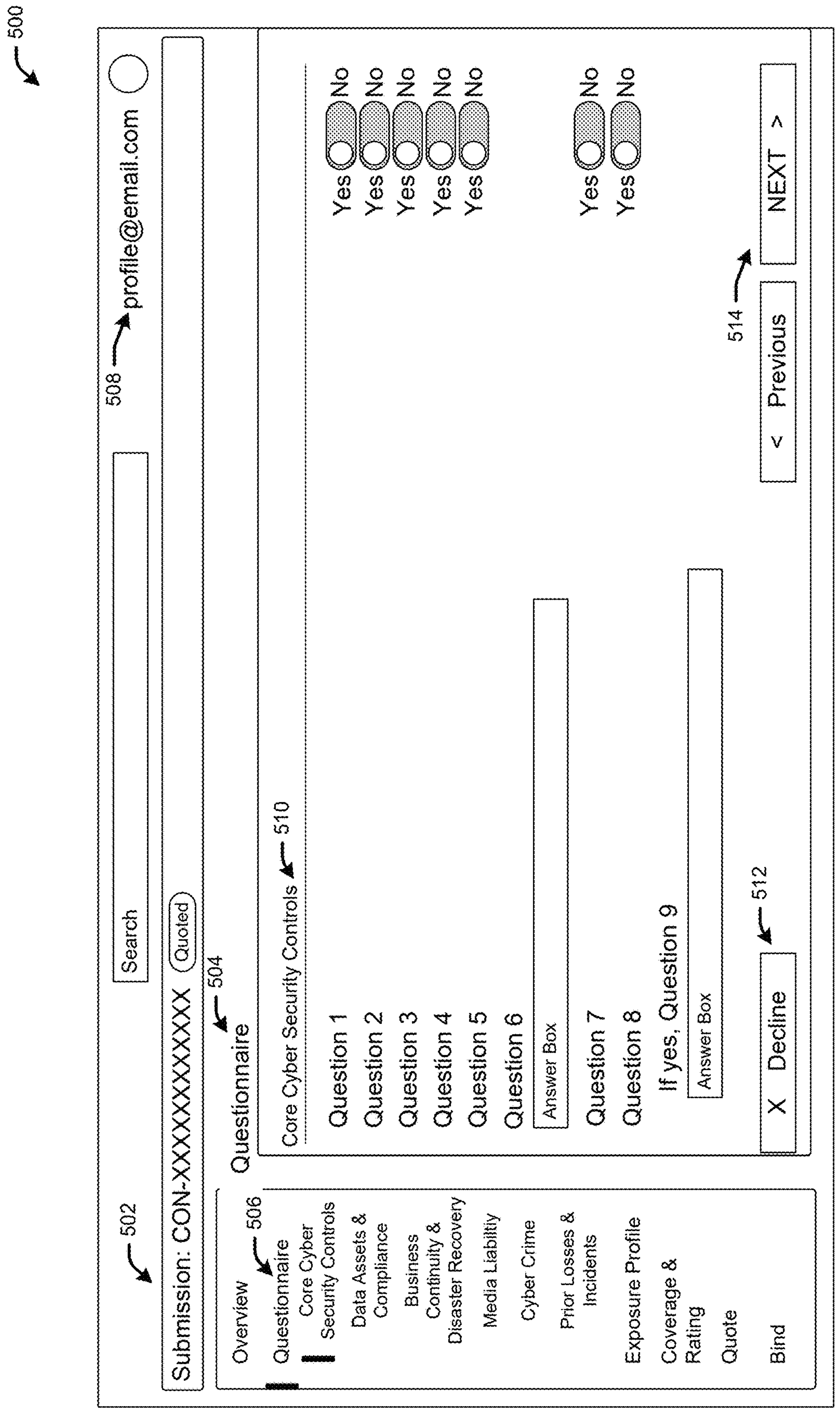
FIG. 5 illustrates a schematic diagram of an example environment for a user questionnaire, according to at least some examples.

FIG. 5 illustrates a schematic diagram of an example environment 500 for a user questionnaire 504, according to at least some examples. As illustrated, the user profile questionnaire 504 may be provided in response to insurance submission 502, where the insurance submission may be provided by a user of the data processing system 100 (e.g., entity, enterprise, individual, broker on behalf of the entity, enterprise, individual, etc.). The submission 502 may include an indication of the contact information 508 associated with the user, entity, etc. As illustrated, the example environment 500 may include an indication of the questionnaire 506 along with other components associated with the submission 502. Included in the questionnaire 504 may be core cyber security controls 510. Additionally, or alternatively, the questionnaire 504 may include questions relating to the user and/or entity preference for cyber security, hardware, software, and/or the like. Additionally, or alternatively, as illustrated in the indication of the questionnaire 506, the questionnaire 504 may include questions relating to data assets and compliance, business continuity and disaster recovery, media liability, cybercrime, and/or prior losses and incidents. The questionnaire 504 may include other types of questions. The questions included in the questionnaire 504 may be provided to the user dynamically and based on the workflow and/or microservices configured by the data processing system 100 that may be specific to an entity. For example, based on the entity that is the subject of the submission 502, questions that are more relevant to the entity may be provided in the questionnaire 504, and may be dynamically updated based on responses to other questions. Additionally, or alternatively, the questionnaire 504 may include user interface components, such as user interface components 512 and/or 514. For example, user interface component 512 may be used to decline coverage and/or insurance for the entity. Additionally, or alternatively, user interface component 514 may be used by the user to proceed to the other components of the submission 502.

Figure 6:
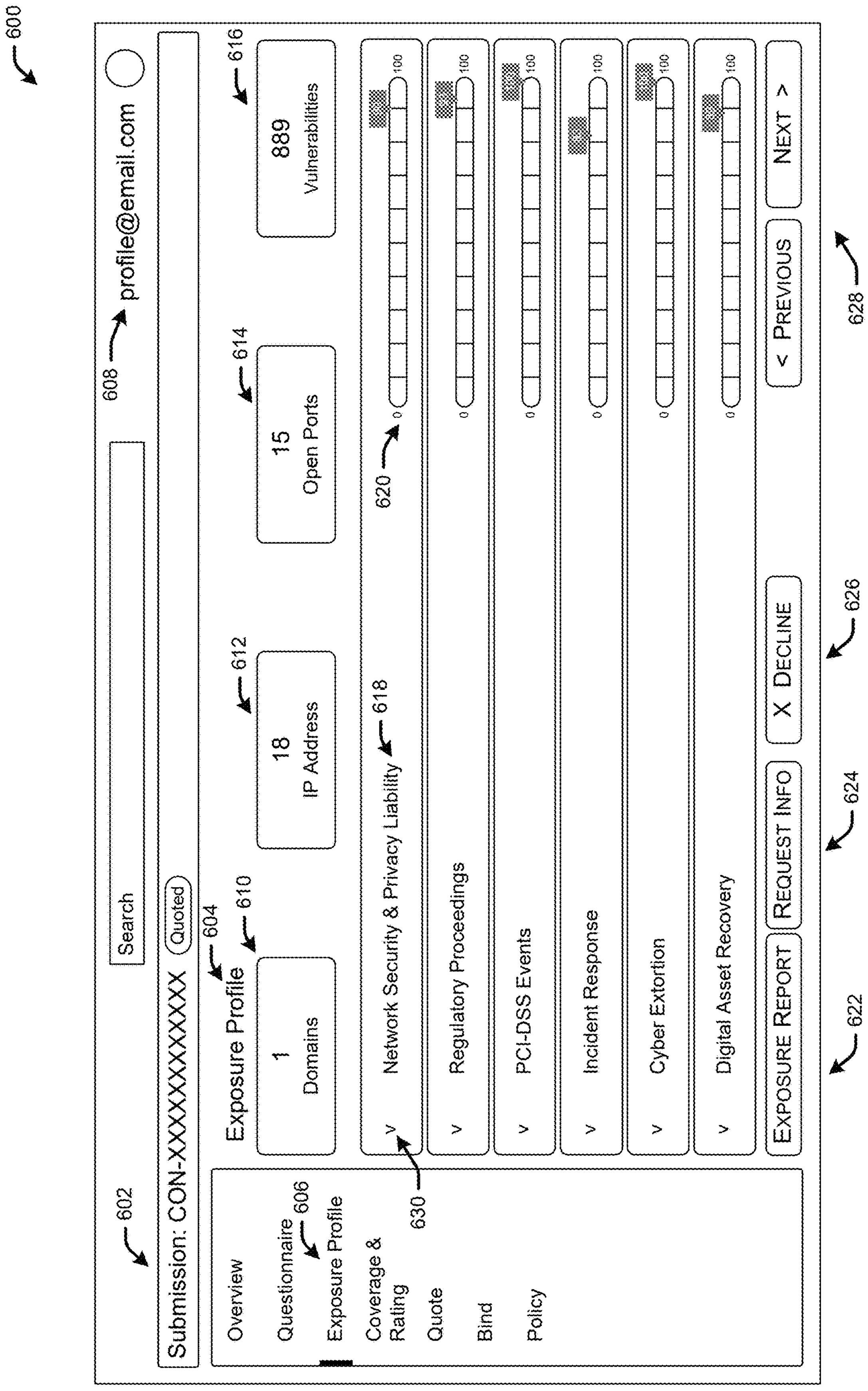
FIG. 6 illustrates a schematic diagram of an example environment for a user exposure profile, according to at least some examples.

FIG. 6 illustrates a schematic diagram of an example environment 600 for a user exposure profile 604, according to at least some examples. As illustrated, the user exposure profile 604 may be included as part of and/or in response to an insurance submission 602, where the insurance submission may be provided by a user of the data processing system 100 (e.g., entity, enterprise, individual, broker on behalf of the entity, enterprise, individual, etc.). The submission 602 may include an indication of the contact information 608 associated with the user, entity, etc. As illustrated, the example environment 600 may include an indication of the exposure profile 606 along with other components associated with the submission 602. Included in the exposure profile 604 may be an indication of domains 610, IP addresses 612, open ports 614, and vulnerabilities 616 associated with entity associated with the submission 602. Additionally, or alternatively, the exposure profile 604 may include individual scores 620 associated with different categories 618. Additionally, or alternatively, the exposure profile 604 may include a single score 620 encompassing all categories 618. As illustrated, a category may include coverage types such as network security and privacy liability, regulatory proceedings, Payment Card Industry Data Security Standard (PCI-DSS) events, incident response, cyber extortion, and/or digital asset recovery. The one or more scores 620 associated with the categories 618 may be included in, but not limited to, a scale of 1-100. The one or more categories 618 may also be associated with a user interface component 630, such as a "drop down" component, such that a user can view further information related to the scores 620 of the category 618 (e.g., the category 618 related to incident response has a lower score of 83, and a user may wish to view more information to determine where any deficiencies are). Additionally, or alternatively, the exposure profile 604 may include user interface components, such as user interface 622, 624, 626, and/or 628. For example, user interface component 622 may be used to generate an exposure report. User interface component 624 may be used to request additional information from the entity and/or other sources of information (e.g., third parties). User interface component 626 may be used to decline coverage and/or insurance for the entity. Additionally, or alternatively, user interface component 628 may be used by the user to proceed to the other components of the submission 602.

Figure 7:
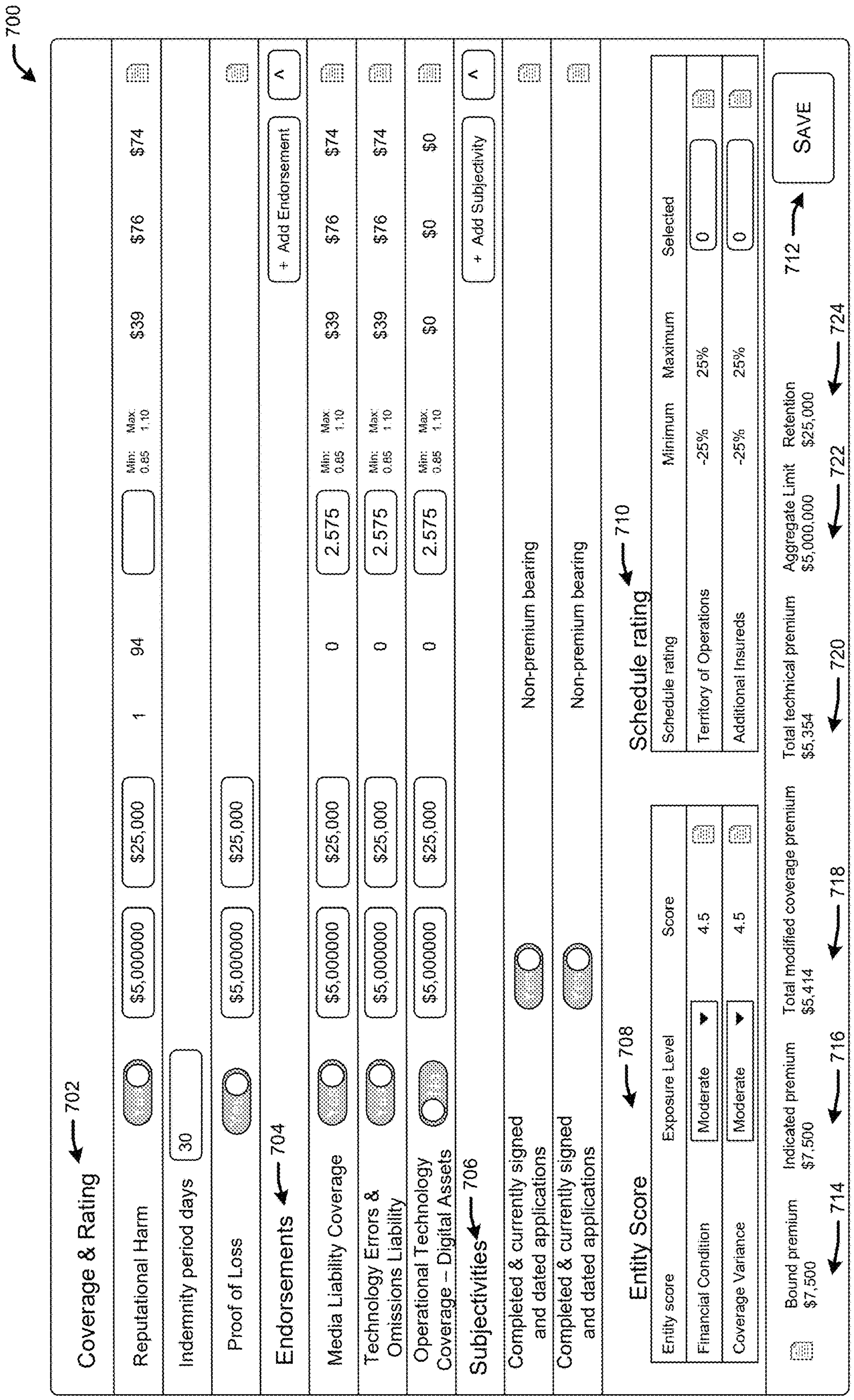
FIG. 7 illustrates a schematic diagram of an example environment for a user coverage and rating, according to at least some examples.

FIG. 7 illustrates a schematic diagram of an example environment 700 for a user coverage and rating 702, according to at least some examples. Additionally, or alternatively, the example environment 700 may also include endorsements 704 and/or subjectivities 706. As illustrated, the coverage and rating 702 may include user interface components to select coverage for reputational harm and/or input a quantity associated with a period of days for indemnity. The coverage and rating 702 may also include user interface components to select proof of loss requirements. Additionally, or alternatively, as illustrated, the endorsements 704 may include user interface components to select media liability coverage, technology errors and omissions liability, and operational technology coverage (e.g., digital assets). Additionally, or alternatively, as illustrated, the subjectivities 706 may include user interface components to indicate completed and currently signed and dated applications. The coverage and rating 702, endorsements 704, and/or subjectivities 706 may also include an indication of policy limits and/or other relevant values associated with a policy, which may be adjusted by the user. By way of illustration, and not limitation, the coverage and rating 702 and/or endorsements 704 may include a minimum modifier value (e.g., 0.85) and/or a maximum modifier value (e.g., 1.10) that may be applied to a base premium value, such as premium 716, in order to determine a modified premium value, such as modified coverage premium 718. In some examples, when a policy limit and/or other value is adjusted by the user, other components and/or values of the environment 700 may be dynamically updated. For example, values associated with a modified premium may be updated and/or modified after a score modifier has been applied. The environment 700 may also include an entity score (e.g., ClearScore of London, United Kingdom) 708 and/or a schedule rating 710. Additionally, or alternatively, the user may be able to see their bound premium 714, indicated premium 716, total modified coverage premium 718, total technical premium 720, aggregate limit 722, retention 724, and/or other metrics related to the cost of the policy. The environment 700 may also include a user interface component 712, where a user may save any changes (e.g., changes to policy limits).

Figure 8:
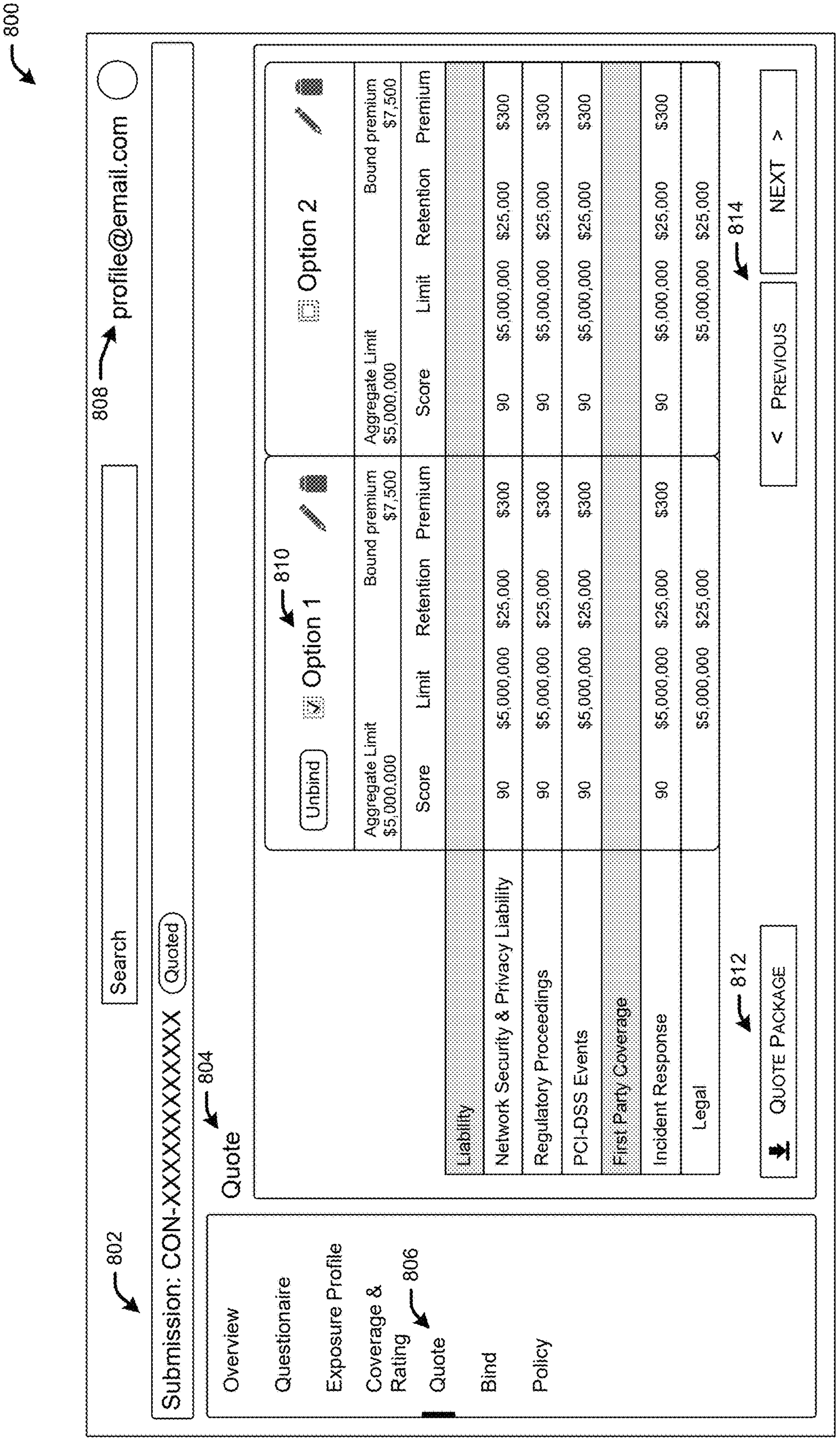
FIG. 8 illustrates a schematic diagram of an example environment for a user quote, according to at least some examples.

FIG. 8 illustrates a schematic diagram of an example environment 800 for a user quote 804, according to at least some examples. As illustrated, user quote 804 may be included as part of and/or in response to insurance submission 802, where the insurance submission may be provided by a user of the data processing system 100 (e.g., entity, enterprise, individual, broker on behalf of the entity, enterprise, individual, etc.). The submission 802 may include an indication of the contact information 808 associated with the user, entity, etc. As illustrated, the example environment 800 may include an indication of the quote 806 along with other components associated with the submission 802. Included in the quote 804 may be one or more options 810 for an insurance policy, such as a policy for potential liabilities related to cybersecurity. Additionally, or alternatively, the quote 804 may include user interface components, such as user interface component 812 and/or user interface component 814. For example, user interface component 812 may include an option to download the quote. Additionally, or alternatively, user interface component 814 may be used by the user to proceed and/or revert back to other components of the submission 802.

Figure 9:
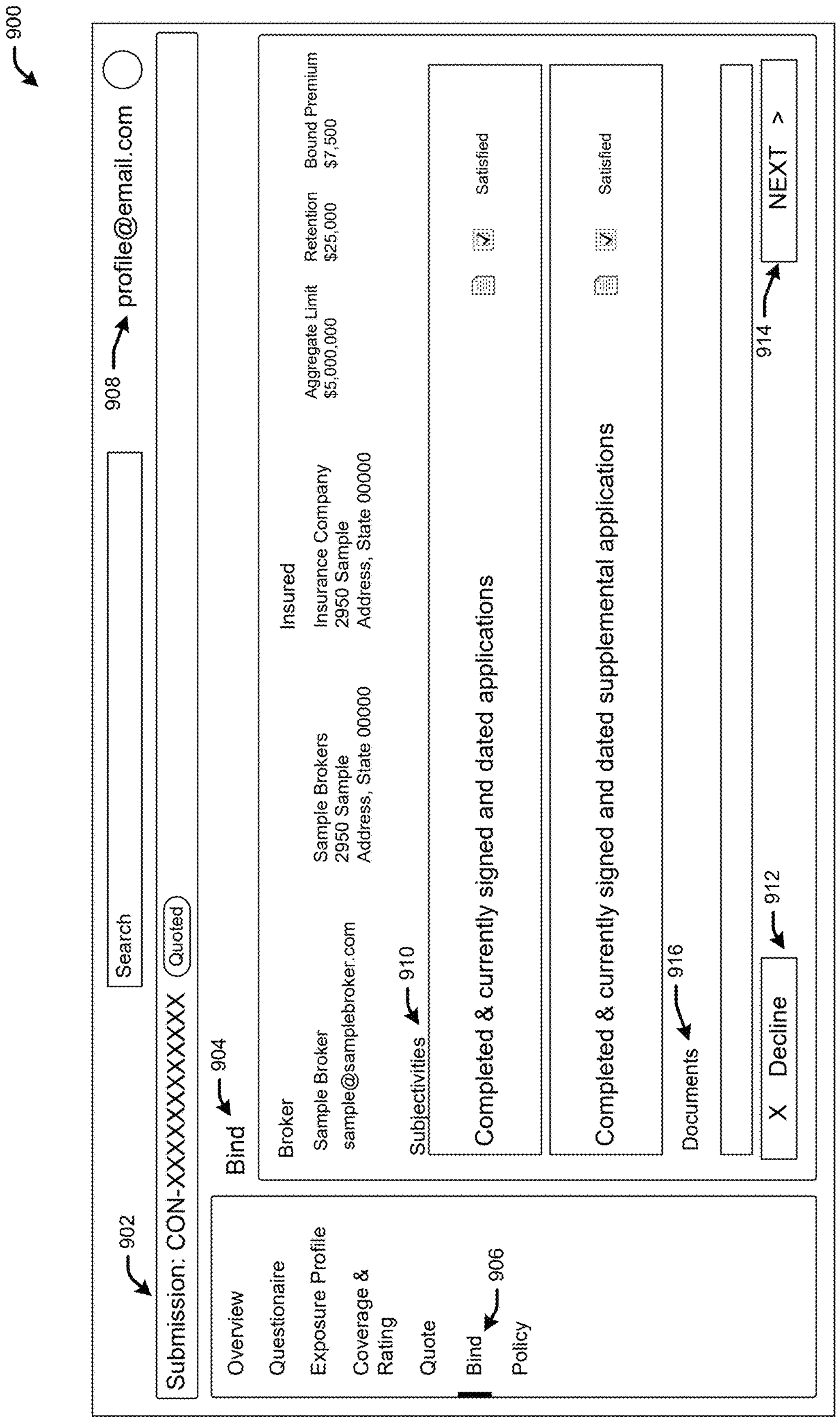
FIG. 9 illustrates a schematic diagram of an example environment for a user bind, according to at least some examples.

FIG. 9 illustrates a schematic diagram of an example environment 900 for a user bind 904, according to at least some examples. As illustrated, user bind 904 may be included as part of and/or in response to insurance submission 902, where the insurance submission may be provided by a user of the data processing system 100 (e.g., entity, enterprise, individual, broker on behalf of the entity, enterprise, individual, etc.). The submission 902 may include an indication of the contact information 908 associated with the user, entity, etc. As illustrated, the example environment 900 may include an indication of the bind 906 along with other components associated with the submission 902. Included in the bind 904 may be information associated with a broker (e.g., the user, if the broker is the user) and/or information associated with the insured (e.g., the entity, enterprise, individual, etc.). The bind 904 may also include subjectivities 910. Additionally, or alternatively, the bind 904 may include user interface components, such as user interface component 912 and/or user interface component 914. For example, user interface component 912 may include an option to decline the bind and/or submission 902. Additionally, or alternatively, user interface component 914 may be used by the user to proceed and/or revert back to other components of the submission 902. The bind 904 may also include an indication of related documents 916, which may be viewable by the user.

Figure 10:
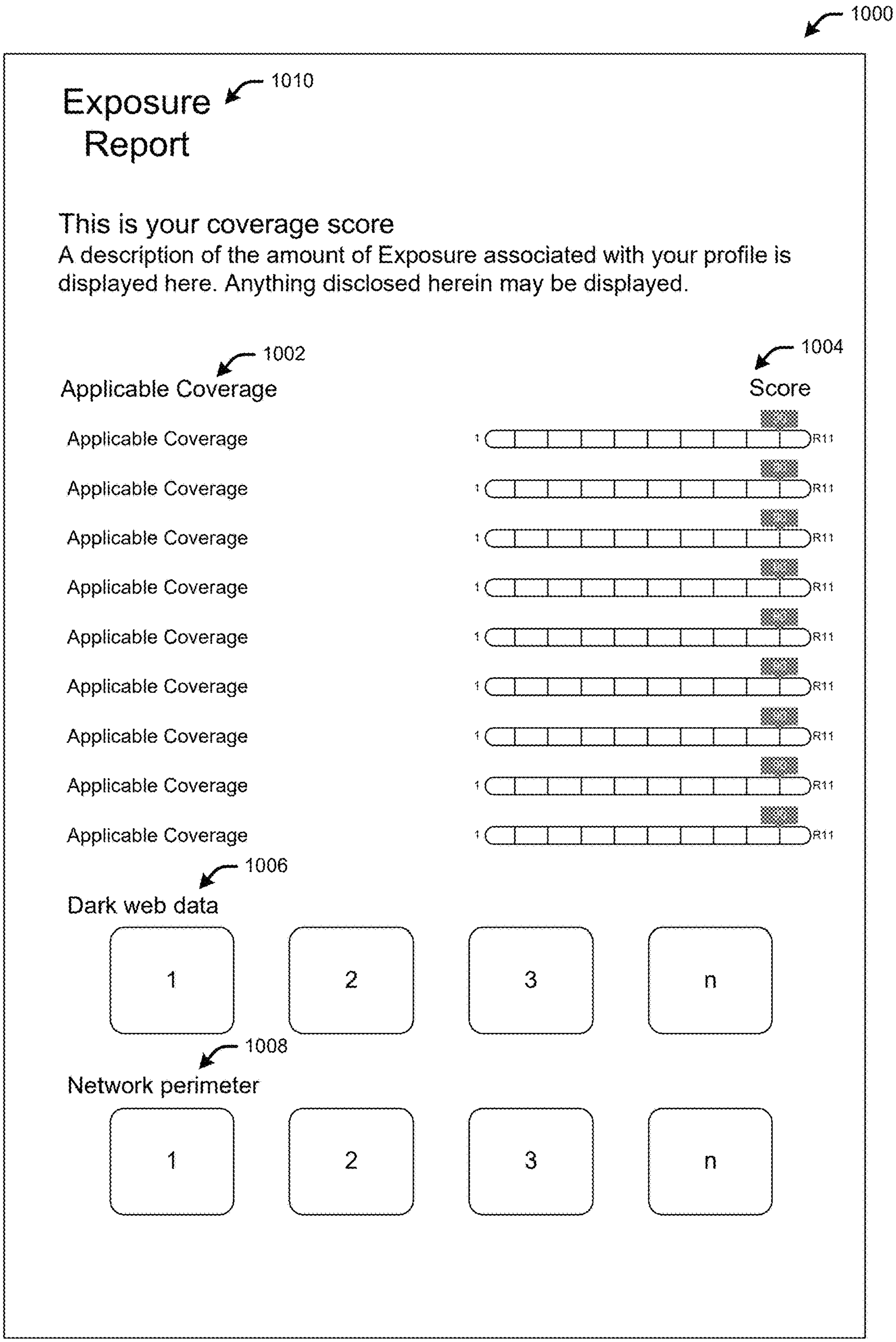
FIG. 10 illustrates a schematic diagram of an example environment for a user generated exposure report, according to at least some examples.

FIG. 10 illustrates a schematic diagram of an example environment 1000 for a user generated exposure report 1010, according to at least some examples. In some instances, as described in FIG. 6 with respect to the user interface component 622, the exposure report 1010 may be presented to the users in response to a submission, completion of a questionnaire, and/or the like. The exposure report 1010 may include various applicable coverages 1002 and/or scores 1004 related to the one or more coverages 1002. The exposure report 1010 may also include other categories with identified areas of exposure associated with an entity. The exposure report 1010 may also include dark web data 1006 and/or network perimeter 1008. For example, the dark web data 1006 may include an indication that, based on the user data and/or information received from third parties and/or data sources, that information related to the entity was leaked on the dark web. Additionally, or alternatively, network perimeter 1008 may include an indication that, based on the user data and/or information received from third parties and/or data sources, that a particular port is open on the network perimeter 1008 that may be usable by a malicious entity and/or adversary. This way, based on dark web data 1006 and network perimeter 1008, users are able to see areas of vulnerability, which could lead to lower scores in the exposure report 1010.

Figure 11:
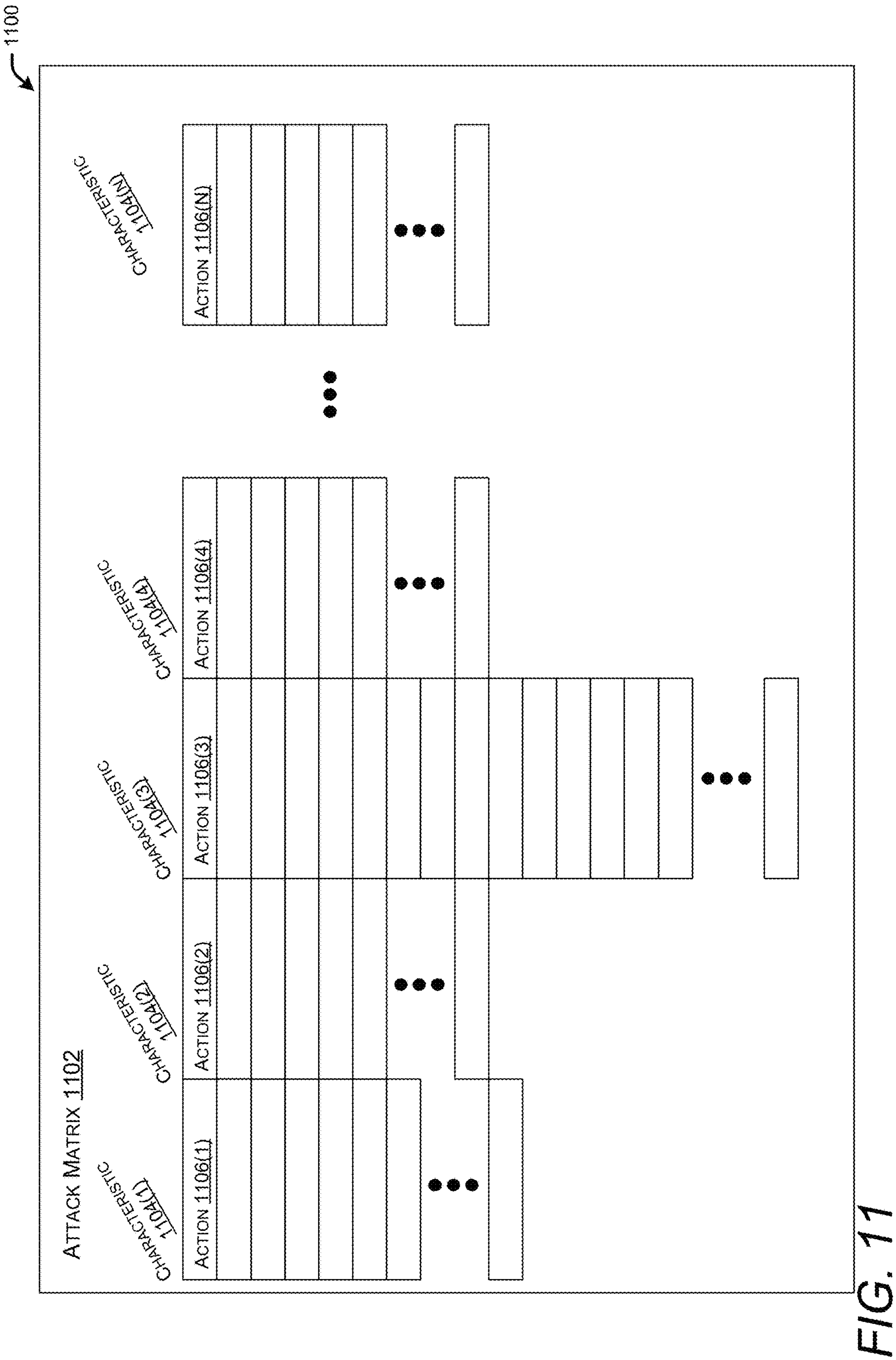
FIG. 11 illustrates a schematic diagram of an example environment for a user generated attack matrix, according to at least some examples.

FIG. 11 illustrates a schematic diagram of an example environment 1100 for a user's generated attack matrix 1102, according to at least some examples. In some instances, the generated attack matrix 1102 may be included as part of an exposure report, such as exposure report 1010 of FIG. 10 and/or the exposure profile 606 of FIG. 6. In some instances, the attack matrix 1102 may be associated with the Adversarial Tactics, Techniques, and Common Knowledge (ATT&CK) framework of The MITRE Corporation of McLean, Virginia. Additionally, or alternatively, the attack matrix 1102 may include an indication of one or more actions 1106(1), 1106(2), 1106(3), 1106(4), and/or 1106(N) (where "N" is any integer greater than one) that have not been started, in progress, and/or are completed with respect to one or more characteristics 1104(1), 1104(2), 1104(3), 1104(4) and/or 1104(N) (where "N" is any integer greater than one). For example, the one or more actions 1106 may include actions that may be taken by malicious entities and/or adversaries. For example, the characteristic 1104(1) may include persistence of malicious entities and/or adversaries. The one or more actions 1106(1) associated with characteristic 1104(1) may include account manipulation, traffic signaling to hide open ports, creating accounts to establish secondary credentialed access, and/or the like. Additionally, or alternatively, the characteristic 1104(2) may include the reconnaissance of malicious entities and/or adversaries. The one or more actions 1106(2) associated with the characteristic 1104(2) may include active scanning, phishing, gathering network information, and/or the like. Additionally, or alternatively, the characteristic 1104(3) may include the execution by malicious entities and/or adversaries. The one or more actions 1106(3) associated with the characteristic 1104(3) may include abusing command and script interpreters, task scheduling functionalities, system services or daemons, and/or the like. Additionally, or alternatively, the characteristic 1104(4) may include defense evasion by malicious entities and/or adversaries. The one or more actions 1106(4) associated with the characteristic 1104(4) may include modifying access tokens, concealing artifacts associated with malicious behavior, and/or the like. Based on the characteristics 1104 and/or actions 1106 included in the attack matrix 1102, which may be indicated in the exposure report 1010 and/or the exposure profile 606, the data processing system 100 may be configured to use the characteristics 1104 and/or actions 1106 in determining coverages associated with an insurance policy, pricing associated with an insurance policy, and/or the like.

Figure 12:
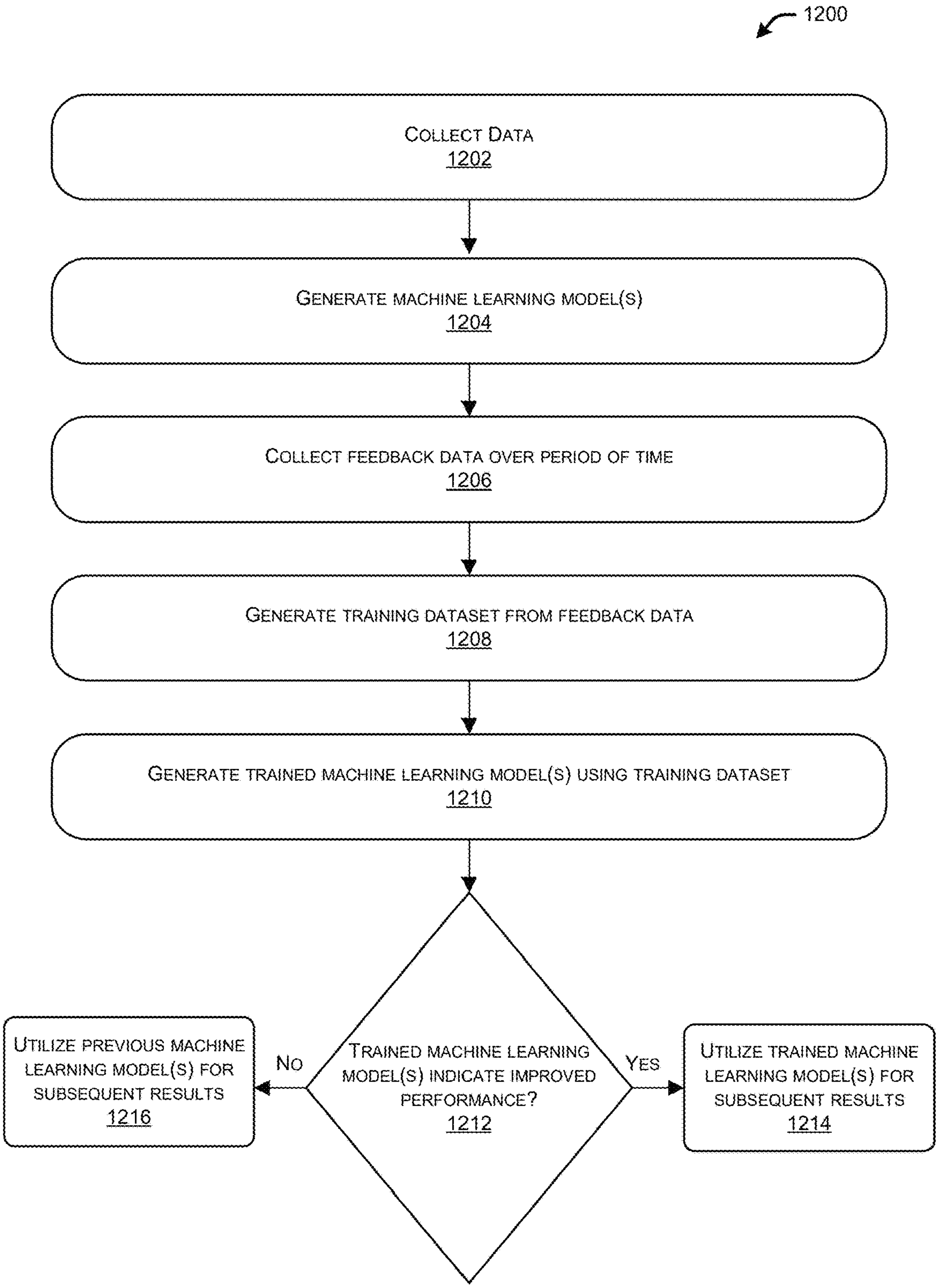
FIG. 12 illustrates a flow diagram of an example process for generation of a machine learning model and the use of the same, according to at least some examples.

FIG. 12 illustrates example process for the generation of a machine-learning model and the use of the same. The order in which the operations or steps are described is not intended to be construed as a limitation, and any number of the described operations may be combined in any order and/or in parallel to implement process 1200.

At block 1202, the process 1200 may include collecting data. The data may include any data described with respect to FIGS. 1-11, or any other data that may be used to perform the operations described herein.

At block 1204, the process 1200 may include generating one or more artificial intelligence models, such as a machine learning model. A number of artificial intelligence techniques may be employed to generate and/or modify the layers and/or models described herein. Those techniques may include, for example, decision tree learning, association rule learning, artificial neural networks (including, in examples, deep learning), inductive logic programming, support vector machines, clustering, Bayesian networks, reinforcement learning, representation learning, similarity and metric learning, sparse dictionary learning, and/or rules-based artificial intelligence.

At block 1206, the process 1200 may include collecting feedback data over a period of time. The feedback data may include any data described with respect to FIGS. 1-11, or any other data that may be used to perform the operations described herein.

At block 1208, the process 1200 may include generating a training dataset from the feedback data. Generation of the training dataset may include formatting the feedback data into input vectors for the artificial intelligence model to intake.

At block 1210, the process 1200 may include generating one or more trained artificial intelligence models using the training dataset. Generation of the trained artificial intelligence models may include updating parameters and/or weightings and/or thresholds used by the models.

At block 1212, the process 1200 may include determining whether the trained artificial intelligence models indicate improved performance metrics. The trained artificial intelligence models may generate results, which may be compared to the known results to determine whether the results of the trained artificial intelligence model produce a superior result than the results of the artificial intelligence model prior to training.

In examples where the trained artificial intelligence models indicate improved performance metrics, the process 1200 may include, at block 1214, using the trained artificial intelligence models for generating subsequent results. For example, the trained artificial intelligence models may be used to calibrate confidence score thresholds and the like. It should be understood that the trained artificial intelligence models may be used in any scenario where models are used as described herein.

In examples where the trained artificial intelligence models do not indicate improved performance metrics, the process 1200 may include, at block 1216, using the previous iteration of the artificial intelligence models for generating subsequent results. Additionally, or alternatively, the process 1200 may include, at block 1216, reverting back to block 1206 and collecting more feedback data over a period of time.

Figure 13:
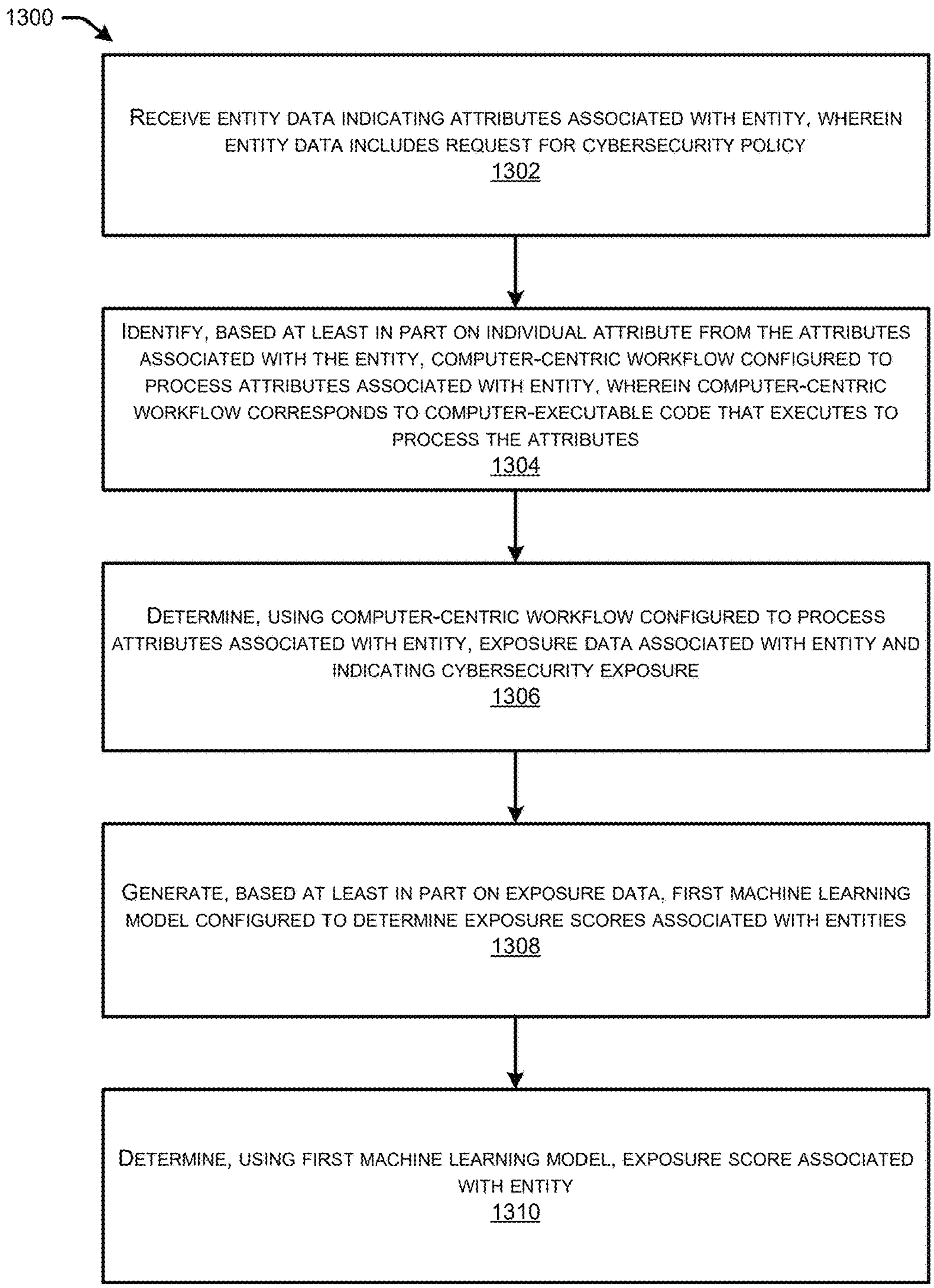
FIG. 13 illustrates a flow diagram of an example process for performing data processing given different types of user submission and the generation of a cybersecurity policy, according to at least some examples.

FIG. 13 illustrates example processes for data processing. Various methods are described with reference to the example system of FIG. 1 and/or the user interfaces of FIGS. 4-10 for convenience and ease of understanding. However, the methods described are not limited to being performed using the systems of FIG. 1 and/or the user interface of FIGS. 4-10, and may be implemented using systems and devices other than those described herein.

The techniques may be applied by a system comprising one or more processors, and one or more non-transitory computer-readable media storing computer-executable instructions that, when executed by the one or more processors, cause the one or more processors to perform operations of process 1300.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some examples, one or more operations of the methods may be omitted entirely. Moreover, the methods described herein can be combined in whole or in part with one another, and/or with other methods.

At block 1302, the process 1300 may include receiving entity data indicating attributes associated with an entity, wherein the entity data includes a request for a cybersecurity policy. For example, a user of a data processing system may have data that may be used in identifying exposures, such as a cybersecurity exposure associated with an entity, enterprise, individual, etc. The user of the data processing system may include the entity, enterprise, individuals, etc. Additionally, or alternatively, the user of the data processing system may be a broker, associated with a digital platform, etc. In some examples, the user data may be included as part of an insurance submission, where the user data may indicate a request for an exposure profile, pricing information for an insurance policy, and/or the like. Additionally, or alternatively, the user data may be associated with an existing insurance policy and/or an insurance claim under an existing policy. The data processing system may enable the user to share data via an application installed on a user device and/or via a web-based application accessed via a web browser. Additionally, or alternatively, the user data may be pushed to the data processing system and/or pulled to the data processing system via connections established by the data processing system (e.g., application programming interface (API) calls with a platform and/or application running on a user device). The user data may include indications of information associated with the user. For example, the user data may include an indication of the type of company (e.g., sole proprietorship, corporation, partnership, limited liability company, etc.), the size of the company, the industry classification (e.g., extraction and agriculture, manufacturing, services, etc.), revenue, and/or the like.

At block 1304, the process 1300 may include identifying, based at least in part on an individual attribute from the attributes associated with the entity, a computer-centric workflow configured to process the attributes associated with the entity, wherein the computer-centric workflow corresponds to computer-executable code that executes to process the attributes. For example, the data processing system may use, or work in combination with, a directed acyclic graph (DAG) component in order to identify a workflow and/or one or more other microservices to collect additional user data and/or fulfill the request for an exposure profile. For example, once the data processing system has received the user data, the data processing system may be configured to identify one or more attributes associated with the user and/or user data. For example, the data processing system may identify attributes associated with the user and/or user data such as the type of company, the size of the company, the industry classification, and/or the revenue. In one example, the data processing system may identify, from user data associated with an entity, that the entity is a sole proprietorship with 30 employees and in the services industry. In another example, the data processing system may identify, from user data associated with an entity, that the entity is a corporation with 500 employees and in the agriculture industry. Based on the one or more attributes identified by the data processing system, the data processing system and/or DAG component may further be configured to identify a workflow that is specific to the entity, where the workflow may be usable by the data processing system to generate an exposure profile associated with the entity. For example, a workflow and/or microservice may be specific to a "smaller" entity (e.g., the entity that is a sole proprietorship with 30 employees and in the services industry) or a "larger" entity (e.g., the entity that is a corporation with 500 employees and in the agriculture industry).

At block 1306, the process 1300 may include determining, using the workflow configured to process the attributes associated with the entity, exposure data associated with the entity and indicating cybersecurity exposure. For example, based on the workflow that is specific to the entity, the data processing system and/or DAG component may further be configured to process the user data and/or trigger other types of microservices. For example, based on the workflow that is specific to the entity, the data processing system may be configured to further collect entity firmographics (e.g., data indicating performance, industry, size, location, etc.), execute security exposure assessments, and/or other types of data based on the DAG microservice. The user data collected by the data processing system may be collected via questions provided to the user. For example, the questions may relate to a user's preference for cyber security, hardware, software, and/or the like. Additionally, or alternatively, the questions may relate to access controls, data assets and compliance, employee training on security policies, types of software used by the entity, business continuity and disaster recovery, media liability, cybercrime, and/or prior losses and incidents. Continuing from the example above, a "smaller" entity may require less questions than a "larger" entity. In other words, the data processing system may use microservices that may be "scaled up" and/or "scaled down" using, and/or working in combination with, the DAG. Once the data processing system has received user data from the user and/or question responses, the data processing system may be configured to further process the user data. For example, the user data may be processed such that the user data is filtered and/or transformed into a consistent format and stored in a graphical database.

At block 1308, the process 1300 may include generating, based at least in part on the exposure data, a first machine learning model configured to determine exposure scores associated with entities. The exposure profile, and/or the one or more scores contained therein, may be determined by a machine learning model configured to determine the exposure profile and/or scores associated with the entity. The machine learning model may be trained by determining one or more scores and/or exposure profiles associated with user data across a plurality of entities over time. Additionally, or alternatively, a price associated with the exposure profile may be determined by a machine learning model configured to determine the pricing associated with the exposure profile. The machine learning model may be trained by determining one or more scores and/or exposure profiles associated with user data across a plurality of entities over time.

At block 1310, the process 1300 may include determining, using the first machine learning model, an exposure score associated with the entity. Once the data processing system has received user data from the user and/or question responses, the data processing system may be configured to use, or work in combination with, the DAG component to execute additional microservices, such as the determination of an exposure profile related pricing for an insurance policy based on the exposure profile. For example, the data processing system may determine an exposure profile. The data processing system may determine, as part of the exposure profile, one or more scores associated with the entity. Additionally, or alternatively, the data processing system may determine one or more factors (e.g., weighting factors) and may determine the one or more scores based on the one or more factors. In some examples, the one or more scores based on the one or more factors may be based on the workflow that is specific to the entity and indicated by the data processing system and/or DAG. For example, similar data for different types of entities may produce different scores based on the workflows that are specific to the entities, and/or data may be weighed differently based on the workflows that are specific to the entities.

Additionally, or alternatively, the process 1300 may include generating, based at least in part on the exposure data, a second machine learning model configured to determine pricing associated with cybersecurity policies, and determining, using the second machine learning model and based at least in part on the exposure score and exposure data, a price associated with the cybersecurity policy for the entity.

Additionally, or alternatively, the process 1300 may include, wherein the entity data is first entity data, the entity is a first entity, the request is a first request, and the workflow is a first workflow, receiving second entity data indicating attributes associated with a second entity, wherein the second entity data includes a second request for a cybersecurity policy. The process 1300 may further include identifying, based at least in part on the individual attribute from the attributes associated with the second entity, a second computer-centric workflow configured to process the attributes associated with the second entity, wherein the second computer-centric workflow corresponds to computer-executable code that executes to process the attributes, determining, using the second workflow configured to process the attributes associated with the second entity, exposure data associated with the second entity and indicating cybersecurity exposure, and determining, using the first machine learning model, the exposure score associated with the second entity.

Additionally, or alternatively, the process 1300 may include wherein the attributes associated with the entity include at least one of an industry class associated with the entity, a revenue associated with the entity, potential partners associated with the entity, a size associated with the entity, and/or a business source associated with the entity.

Additionally, or alternatively, the process 1300 may include wherein determining, using the computer-centric workflow configured to process the attributes associated with the entity, exposure data associated with the entity further comprises identifying, using the computer-centric workflow configured to process attributes associated with the entity, wherein the computer-centric workflow corresponds to computer-executable code that executes to process the attributes, a set of questions based on the attributes associated with the entity. The process 1300 may further include causing display of one or more user interface components indicating the set of questions, receiving user input data indicating an entity response to the set of questions, and determining, based at least in part on the entity response, the exposure data associated with the entity and indicating the cybersecurity exposure.

Additionally, or alternatively, the process 1300 may include wherein the workflow is a first workflow, the entity is a first entity, and the set of questions is a first set of questions, identifying, using a second computer-centric workflow configured to process attributes associated with a second entity, wherein the second computer-centric workflow corresponds to the computer-executable code that executes to process the attributes, a second set of questions based on the attributes associated with the second entity. The process 1300 may further include causing display of one or more user interface components indicating the second set of questions, receiving user input data indicating an entity response to the second set of questions, and determining, based at least in part on the entity response, the exposure data associated with the second entity and indicating the cybersecurity exposure.

Additionally, or alternatively, the process 1300 may include determining, using the first machine learning model, the exposure score associated with the entity, wherein the exposure score indicates a coverage type, or determining, using the first machine learning model, the exposure score associated with the entity, wherein the exposure score indicates a group of coverage types.

Additionally, or alternatively, the process 1300 may include wherein the coverage type or the group of coverage types include at least one of network security liability, regulatory proceedings, incident response, cyber extortion, and/or digital asset recovery.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system, comprising:

one or more processors; and non-transitory computer-readable media storing computer-executable instructions that, when executed by the one or more processors, cause the one or more processors to perform operations comprising:

receiving, from a data source, entity data indicating attributes associated with an entity, wherein the entity data includes a request for a cybersecurity policy;

identifying, based at least in part on an individual attribute from the attributes associated with the entity, a computer-centric workflow configured to process the attributes associated with the entity, wherein the computer-centric workflow corresponds to computer-executable code that executes to process the attributes, and wherein the individual attribute indicates a size associated with the entity;

determining, based at least in part on the computer-centric workflow configured to process the attributes associated with the entity, a microservice from a group of microservices and associated with a directed acyclic graph (DAG), wherein the microservice corresponds to the individual attribute indicating the size associated with the entity;

executing, using the computer-centric workflow configured to process the attributes associated with the entity, the microservice;

determining, using the computer-centric workflow configured to process the attributes associated with the entity and based at least in part on the microservice, exposure data associated with the entity and indicating cybersecurity exposure;

generating, based at least in part on the exposure data, a first machine learning model configured to determine exposure scores associated with entities;

determining, using the first machine learning model, an exposure score associated with the entity;

generating, based at least in part on the exposure data, a second machine learning model configured to determine pricing associated with cybersecurity policies; and determining, using the second machine learning model and based at least in part on the exposure score and exposure data, a price associated with the cybersecurity policy for the entity.

2. The system of claim 1, wherein the entity data is first entity data, the entity is a first entity, the request is a first request, and the computer-centric workflow is a first computer-centric workflow, the operations further comprising:

receiving, from the data source, second entity data indicating attributes associated with a second entity, wherein the second entity data includes a second request for a cybersecurity policy;

identifying, based at least in part on the individual attribute from the attributes associated with the second entity, a second computer-centric workflow configured to process the attributes associated with the second entity, wherein the second computer-centric workflow corresponds to the computer-executable code that executes to process the attributes;

determining, using the second computer-centric workflow configured to process the attributes associated with the second entity, exposure data associated with the second entity and indicating cybersecurity exposure;

determining, using the first machine learning model, the exposure score associated with the second entity; and determining, using the second machine learning model and based at least in part on the exposure score and exposure data, the price associated with the cybersecurity policy for the second entity.

3. The system of claim 1, wherein the attributes associated with the entity further include at least one of:

an industry class associated with the entity;

a revenue associated with the entity;

potential partners associated with the entity;

or a business source associated with the entity.

4. The system of claim 3, wherein determining, using the computer-centric workflow configured to process the attributes associated with the entity, exposure data associated with the entity further comprises:

identifying, using the computer-centric workflow configured to process attributes associated with the entity, wherein the computer-centric workflow corresponds to the computer-executable code that executes to process the attributes, one or more questions based on the attributes associated with the entity;

causing display of one or more user interface components indicating the one or more questions;

receiving user input data indicating an entity response to the one or more questions; and determining, based at least in part on the entity response, the exposure data associated with the entity and indicating the cybersecurity exposure.

5. A method, comprising:

receiving entity data indicating attributes associated with an entity, wherein the entity data includes a request for a cybersecurity policy;

identifying, based at least in part on an individual attribute from the attributes associated with the entity, a computer-centric workflow configured to process the attributes associated with the entity, wherein the computer-centric workflow corresponds to computer-executable code that executes to process the attributes, and wherein the individual attribute indicates a size associated with the entity;

determining, based at least in part on the computer-centric workflow configured to process the attributes associated with the entity, a microservice from a group of microservices and associated with a directed acyclic graph (DAG), wherein the microservice corresponds to the individual attribute indicating the size associated with the entity;

executing, using the computer-centric workflow configured to process the attributes associated with the entity, the microservice;

determining, using the computer-centric workflow configured to process the attributes associated with the entity and based at least in part on the microservice, exposure data associated with the entity and indicating cybersecurity exposure;

generating, based at least in part on the exposure data, a first machine learning model configured to determine exposure scores associated with entities; and determining, using the first machine learning model, an exposure score associated with the entity.

6. The method of claim 5, further comprising:

generating, based at least in part on the exposure data, a second machine learning model configured to determine pricing associated with cybersecurity policies; and determining, using the second machine learning model and based at least in part on the exposure score and exposure data, a price associated with the cybersecurity policy for the entity.

7. The method of claim 5, wherein the entity data is first entity data, the entity is a first entity, the request is a first request, and the computer-centric workflow is a first computer-centric workflow, the method further comprising:

receiving second entity data indicating attributes associated with a second entity, wherein the second entity data includes a second request for a cybersecurity policy;

identifying, based at least in part on the individual attribute from the attributes associated with the second entity, a second computer-centric workflow configured to process the attributes associated with the second entity, wherein the second computer-centric workflow corresponds to computer-executable code that executes to process the attributes;

determining, using the second computer-centric workflow configured to process the attributes associated with the second entity, exposure data associated with the second entity and indicating cybersecurity exposure; and determining, using the first machine learning model, the exposure score associated with the second entity.

8. The method of claim 5, wherein the attributes associated with the entity further include at least one of:

an industry class associated with the entity;

a revenue associated with the entity;

potential partners associated with the entity;

or a business source associated with the entity.

9. The method of claim 5, wherein determining, using the computer-centric workflow configured to process the attributes associated with the entity, exposure data associated with the entity further comprises:

identifying, using the computer-centric workflow configured to process attributes associated with the entity, wherein the computer-centric workflow corresponds to the computer-executable code that executes to process the attributes, a set of questions based on the attributes associated with the entity;

causing display of one or more user interface components indicating the set of questions;

receiving user input data indicating an entity response to the set of questions; and determining, based at least in part on the entity response, the exposure data associated with the entity and indicating the cybersecurity exposure.

10. The method of claim 9, wherein the computer-centric workflow is a first computer-centric workflow, the entity is a first entity, and the set of questions is a first set of questions, the method further comprising:

identifying, using a second computer-centric workflow configured to process attributes associated with a second entity, wherein the second computer-centric workflow corresponds to the computer-executable code that executes to process the attributes, a second set of questions based on the attributes associated with the second entity;

causing display of one or more user interface components indicating the second set of questions;

receiving user input data indicating an entity response to the second set of questions; and determining, based at least in part on the entity response, the exposure data associated with the second entity and indicating the cybersecurity exposure.

11. The method of claim 5, further comprising at least one of:

determining, using the first machine learning model, the exposure score associated with the entity, wherein the exposure score indicates a coverage type; or determining, using the first machine learning model, the exposure score associated with the entity, wherein the exposure score indicates a group of coverage types.

12. The method of claim 11, wherein the coverage type or the group of coverage types include at least one of:

network security liability;

regulatory proceedings;

incident response;

cyber extortion; or digital asset recovery.

13. A non-transitory computer-readable media storing instructions that, when executed, cause one or more processors to perform operations comprising:

receiving entity data indicating attributes associated with an entity, wherein the entity data includes a request for a cybersecurity policy;

identifying, based at least in part on an individual attribute from the attributes associated with the entity, a computer-centric workflow configured to process the attributes associated with the entity, wherein the computer-centric workflow corresponds to computer-executable code that executes to process the attributes, and wherein the individual attribute indicates a size associated with the entity;

determining, based at least in part on the computer-centric workflow configured to process the attributes associated with the entity, a microservice from a group of microservices and associated with a directed acyclic graph (DAG), wherein the microservice corresponds to the individual attribute indicating the size associated with the entity;

executing, using the computer-centric workflow configured to process the attributes associated with the entity, the microservice;

determining, using the computer-centric workflow configured to process the attributes associated with the entity and based at least in part on the microservice, exposure data associated with the entity and indicating cybersecurity exposure;

generating, based at least in part on the exposure data, a first machine learning model configured to determine exposure scores associated with entities; and determining, using the first machine learning model, an exposure score associated with the entity.

14. The non-transitory computer-readable media of claim 13, the operations further comprising:

generating, based at least in part on the exposure data, a second machine learning model configured to determine pricing associated with cybersecurity policies; and determining, using the second machine learning model and based at least in part on the exposure score and exposure data, a price associated with the cybersecurity policy for the entity.

15. The non-transitory computer-readable media of claim 13, wherein the entity data is first entity data, the entity is a first entity, the request is a first request, and the computer-centric workflow is a first computer-centric workflow, the operations further comprising:

receiving second entity data indicating attributes associated with a second entity, wherein the second entity data includes a second request for a cybersecurity policy;

identifying, based at least in part on the individual attribute from the attributes associated with the second entity, a second computer-centric workflow configured to process the attributes associated with the second entity, wherein the second computer-centric workflow corresponds to computer-executable code that executes to process the attributes;

determining, using the second computer-centric workflow configured to process the attributes associated with the second entity, exposure data associated with the second entity and indicating cybersecurity exposure; and determining, using the first machine learning model, the exposure score associated with the second entity.

16. The non-transitory computer-readable media of claim 13, wherein the attributes associated with the entity further include at least one of:

an industry class associated with the entity;

a revenue associated with the entity;

potential partners associated with the entity;

or a business source associated with the entity.

17. The non-transitory computer-readable media of claim 13, wherein determining, using the computer-centric workflow configured to process the attributes associated with the entity, exposure data associated with the entity further comprises:

identifying, using the computer-centric workflow configured to process attributes associated with the entity, wherein the computer-centric workflow corresponds to the computer-executable code that executes to process the attributes, a set of questions based on the attributes associated with the entity;

causing display of one or more user interface components indicating the set of questions;

receiving user input data indicating an entity response to the set of questions; and determining, based at least in part on the entity response, the exposure data associated with the entity and indicating the cybersecurity exposure.

18. The non-transitory computer-readable media of claim 17, wherein the computer-centric workflow is a first computer-centric workflow, the entity is a first entity, and the set of questions is a first set of questions, the operations further comprising:

identifying, using a second computer-centric workflow configured to process attributes associated with a second entity, wherein the second computer-centric workflow corresponds to the computer-executable code that executes to process the attributes, a second set of questions based on the attributes associated with the second entity;

causing display of one or more user interface components indicating the second set of questions;

receiving user input data indicating an entity response to the second set of questions; and determining, based at least in part on the entity response, the exposure data associated with the second entity and indicating the cybersecurity exposure.

19. The non-transitory computer-readable media of claim 13, further comprising at least one of:

determining, using the first machine learning model, the exposure score associated with the entity, wherein the exposure score indicates a coverage type; or determining, using the first machine learning model, the exposure score associated with the entity, wherein the exposure score indicates a group of coverage types.

20. The non-transitory computer-readable media of claim 19, wherein the coverage type or the group of coverage types include at least one of:

network security liability;

regulatory proceedings;

incident response;

cyber extortion; or digital asset recovery.

* * * * *